US012509534B2

(12) United States Patent
Periyasamy et al.

(10) Patent No.: US 12,509,534 B2
(45) Date of Patent: Dec. 30, 2025

(54) ARTICLES FORMED FROM FLUORINE-CONTAINING ELASTOMER COMPOSITIONS USING AN ADDITIVE MANUFACTURING METHOD AND ADDITIVE MANUFACTURING METHODS FOR THERMOSET ELASTOMER COMPOSITIONS

(71) Applicants: Greene, Tweed Technologies, Inc., Wilmington, DE (US); University of Massachusetts, Boston, MA (US)

(72) Inventors: Mookkan Periyasamy, Wilmington, DE (US); Ronald R. Campbell, Harleysville, PA (US); Elizabeth Sassano, West Chester, PA (US); Joey Mead, Boston, MA (US); David Kazmer, Boston, MA (US); ShibShankar Banerjee, Boston, MA (US); Stephen Burbine, Boston, MA (US); Erin E. Keaney, Boston, MA (US); Leeda Phaen, Boston, MA (US)

(73) Assignees: Greene, Tweed Technologies, Inc., Wilmington, DE (US); University of Massachusetts, Boston, MA (US)

( * ) Notice: Subject to any disclaimer, the term of this patent is extended or adjusted under 35 U.S.C. 154(b) by 0 days.

(21) Appl. No.: 17/219,249

(22) Filed: Mar. 31, 2021

(65) Prior Publication Data
US 2021/0395405 A1    Dec. 23, 2021

Related U.S. Application Data

(60) Provisional application No. 63/003,149, filed on Mar. 31, 2020.

(51) Int. Cl.
*B33Y 10/00*  (2015.01)
*B29C 64/118*  (2017.01)
(Continued)

(52) U.S. Cl.
CPC ............ *C08F 14/18* (2013.01); *B29C 64/118* (2017.08); *B29C 64/209* (2017.08);
(Continued)

(58) Field of Classification Search
CPC ..... B29C 64/118; B29C 64/209; B29C 64/32; B33Y 10/00; B33Y 30/00
See application file for complete search history.

(56) References Cited

U.S. PATENT DOCUMENTS 7,122,246 B2 * 10/2006 Comb .................... B33Y 80/00
                                                             428/401
7,891,964 B2 *  2/2011 Skubic .................... B29C 48/37
                                                             425/375

(Continued)

FOREIGN PATENT DOCUMENTS

KR       10-1983646 B1     5/2019
TW       201840397 A      11/2018
(Continued)

OTHER PUBLICATIONS

International Search Report and Written Opinion in Counterpart WO Application PCT/US21/25276 Aug. 9, 2021 (22 pages).

(Continued)

*Primary Examiner* — Galen H Hauth
*Assistant Examiner* — Mohamed K Ahmed Ali
(74) *Attorney, Agent, or Firm* — Calderone McKay LLC

(57) ABSTRACT

An apparatus suitable for extruding curable polymers for forming elastomer articles using additive manufacturing, and curable fluorine-containing polymer compositions suitable for use in such an apparatus are disclosed along with an additive manufacturing method for forming a fluorine-containing elastomer article including providing a filament formed of a curable fluoropolymer composition; providing an additive manufacturing printer having a drive mechanism
(Continued)

and a printer nozzle; feeding the filament into an additive manufacturing printer through the drive mechanism and through a longitudinal passage defined by an interior wall of a support tube, wherein the support tube extends from a first end to a second end, and wherein the second end of the support tube is positioned near an inlet to a printer nozzle; applying heat to the filament; and printing successive layers of the heated filament exiting an outlet of the nozzle onto a substrate using the additive manufacturing printer to form the fluorine-containing elastomer article.

28 Claims, 15 Drawing Sheets

(51) Int. Cl.
  *B29C 64/209* (2017.01)
  *B29C 64/321* (2017.01)
  *B33Y 30/00* (2015.01)
  *B33Y 70/00* (2020.01)
  *C08F 14/18* (2006.01)
  *B29K 27/18* (2006.01)

(52) U.S. Cl.
  CPC ............ *B29C 64/321* (2017.08); *B33Y 10/00* (2014.12); *B33Y 30/00* (2014.12); *B33Y 70/00* (2014.12); *B29K 2027/18* (2013.01)

(56) References Cited

U.S. PATENT DOCUMENTS

| | | | |
|---|---|---|---|
| 10,195,778 B2 | 2/2019 | Wolf et al. | |
| 10,254,499 B1 | 4/2019 | Cohen et al. | |
| 10,259,936 B2 | 4/2019 | Liu et al. | |
| 2009/0274540 A1* | 11/2009 | Batchelder | B65H 51/00 414/431 |
| 2012/0231225 A1* | 9/2012 | Mikulak | D01F 8/12 264/255 |
| 2014/0353878 A1* | 12/2014 | Driessen | B29C 64/129 264/401 |
| 2015/0028523 A1* | 1/2015 | Jaker | B29B 9/16 525/450 |
| 2017/0239866 A1 | 8/2017 | Mohammad et al. | |
| 2018/0131124 A1 | 5/2018 | Matlack et al. | |
| 2018/0237627 A1* | 8/2018 | Liu | B33Y 10/00 |
| 2019/0030794 A1 | 1/2019 | Jiang et al. | |
| 2019/0054659 A1* | 2/2019 | Tseng | B33Y 70/10 |
| 2019/0337235 A1* | 11/2019 | Moosberg | C04B 35/48 |
| 2019/0344496 A1 | 11/2019 | Bartow et al. | |
| 2021/0299949 A1 | 9/2021 | Periyasamy et al. | |
| 2022/0024131 A1 | 1/2022 | Palmaers | |
| 2024/0286347 A1 | 8/2024 | Periyasamy et al. | |

FOREIGN PATENT DOCUMENTS

| | | |
|---|---|---|
| WO | WO 2017/127569 A1 | 7/2017 |
| WO | WO 2017/156415 A1 | 9/2017 |
| WO | WO 2024/107771 A1 | 5/2024 |

OTHER PUBLICATIONS

Kumar et al., "3D Printing of Flexible Parts Using EVA Material," Materials Physics and Mechanics 37 (2018) pp. 124-132.

Kumar et al., Additive Manufacturing of Flexible Electrically Conductive Polymer Composites via CNC-Assisted Fused Layer Modeling Process, J. of Brazilian Society of Mechanical Sciences and Engineering (2018) 40:175 (13 pages).

Elkins et al., Soft Elastomers for Fused Deposition Modeling, Virginia Polytechnic Institute and State University, presented in the International Solid Freeform Fabrication Symposium (1997) (8 pages).

Canadian Office Action in Counterpart 3,174,335 (3 pages) dated Mar. 18, 2024.

Response to Canadian Office Action in Counterpart 3,174,335 (Jul. 18, 2024) 17 pages.

European Extended Search Report in Counterpart Application 21781576 (Mar. 11, 2024) 19 pages.

International Search Report from Counterpart CIP PCT Application PCT/US2023/079703 Apr. 19, 2024 (27 pages).

Extended European Search Report, European Counterpart Application No. 21781576, Jun. 12, 2024, 19 pages.

Response to Extended European Search Report, European Counterpart Application No. 21781576, Mar. 20, 2025, 10 pages.

Taiwanese Office Action with English Translation, Taiwanese Counterpart Application No. 110111930, Jan. 3, 2025, 20 pages.

Taiwanese Response to Office Action with English Claims, Taiwanese Counterpart Application No. 110111930, Jun. 3, 2025, 24 pages.

Japanese Office Action with English Translation, Japanese Counterpart Application No. 2022-560057, Apr. 17, 2025, 21 pages.

* cited by examiner

ARTICLES FORMED FROM FLUORINE-CONTAINING ELASTOMER COMPOSITIONS USING AN ADDITIVE MANUFACTURING METHOD AND ADDITIVE MANUFACTURING METHODS FOR THERMOSET ELASTOMER COMPOSITIONS

CROSS-REFERENCE TO RELATED APPLICATIONS

This non-provisional patent application claims priority to and the benefit under 35 U.S.C. § 119(e) of U.S. Provisional Patent Application No. 63/003,149, filed Mar. 31, 2020, entitled, "Articles Formed From Fluorine-containing Elastomer Compositions Using an Additive Manufacturing Method and Additive Manufacturing Methods for Thermoset Elastomer Compositions," the entire disclosure of which is incorporated herein by reference.

BACKGROUND OF THE INVENTION

Field of the Invention

The invention relates the field of additive manufacturing, particularly additive manufacturing of thermoset elastomers, including fluorine-containing elastomers, through fused filament fabrication and deposition.

Description of Related Art

Additive manufacturing, also commonly referred to as three-dimensional ("3D") printing is increasing in popularity for rapid prototyping and commercial production of articles. Various types of additive manufacturing processes are known, including vat photopolymerization methods such as stereolithography ("SLA"), material or binder jetting methods, powder bed fusion methods such as selective laser sintering ("SLS"), and material extrusion methods such as fused deposition modeling ("FDM"), fused-filament fabrication ("FFF") and direct pellet extrusion, among others.

In vat photopolymerization methods, a liquid photopolymer resin is stored in a vat in which a build platform is positioned. An article can be formed based on a computer model of the article in which the article is represented as a series of layers or cross sections. Based on the computer model, a first layer of the article is formed using UV light to selectively cure the liquid photopolymer resin. Once the first layer is formed, the build platform is lowered, and the UV light is used to cure the liquid photopolymer resin so as to form a subsequent layer of the article on top of the first layer. This process is repeated until the printed article is formed.

In material jetting methods, an article is prepared in a layer-by-layer manner by depositing drops of a liquid material, such as a thermoset photopolymer, to form a first layer of the article based on a computer model of the article. The deposited layer of liquid material is cured or solidified, such as by the application of UV light. Subsequent layers are deposited in the same manner so as to produce a printed article. In binder jetting, an article is formed by depositing a layer of a powdered material on a build platform and selectively depositing a liquid binder to join the powder. Subsequent layers of powder and binder are deposited in the same manner and the binder serves as an adhesive between powder layers.

In powder bed fusion methods, and specifically SLS, an article is formed by generating a computer model of the article to be printed in which the article is represented as a series of layers or cross-sections. To prepare the article, a layer of powder is deposited on a build platform and the powder is sintered by the use of a laser to form a layer of the article based on the computer model. Once the layer is sintered, a further layer of powder is deposited and sintered. This process is repeated as necessary to form the article having the desired configuration.

In material extrusion methods, such as FDM or FFF, a computer model of an article is generated in which the article is represented as a series of layers. The article is produced by feeding a filament of material to an extruding head which heats the filament and deposits the heated filament on a substrate to form a layer of the article. Once a layer is formed, the extruding head proceeds to deposit the next layer of the article based upon the computer model of the article. This process is repeated in a layer-by-layer manner until the printed article is fully formed. Similarly, in direct pellet extrusion, pellets rather than filaments are used as the feed material, and the pellets are fed to an extruding head and are heated and deposited onto the substrate.

A variety of polymeric materials are known for use in additive manufacturing methods. Common polymeric materials used in additive manufacturing include acrylonitrile butadiene styrene (ABS), polyurethane, polyamide, polystyrene, and polylactic acid (PLA). More recently, high performance engineering thermoplastics have been used to produce printed articles with improved mechanical and chemical properties relative to common polymer materials. Such high-performance thermoplastics include, polyaryletherketones, polyphenylsulfones, polycarbonates, and polyetherimides.

While additive manufacturing methods can be used to rapidly form an article having any of various shapes and configurations, articles formed by additive manufacturing processes can suffer from weak inter-layer adhesion in the z-direction of the printed article.

Currently, additive manufacturing using material extrusion three-dimensional printing (ME3DP) based on FFF and FDM is considered a highly flexible and efficient additive manufacturing technique. In this process, a thermoplastic filament is heated and then "extruded" and fused to an underlying layer. This technique is viewed in that art as potentially useful for developing manufactured components with more complex geometries using computer-assisted design.

In addition to using the materials used as noted above, there have been further attempts to develop techniques using FFF for printing soft thermoplastic elastomers such as ethylene vinyl acetate (EVA), ethylene-propylene diene monomer in a polypropylene matrix (EPDM+PP), acrylonitrile-butadiene-styrene (ABS) and styrene-ethylene-butadiene-styrene (SEBS). However, such materials present challenges in processing using FFF to form articles. See, N Kumar et al., "3D Printing of Flexible Parts Using EVA Material," Materials Physics and Mechanics 37, pp. 124-132 (2018); N. Kumar et al., "Additive Manufacturing of Flexible Electrically Conductive Polymer Compositions Using CNC-Assisted Fused Layer Modeling Process," Journal of the Brazilian Society of Mechanical Sciences and Engineering, 40:175 (2018) and K. Elkins et al., "Soft Elastomers for Fused Deposition Modeling," Virginia Polytechnic Institute and State University, presented in the International Solid Freeform Fabrication Symposium (1997).

As such materials are soft, they tend to lack adequate compression set and heat resistance for many applications. To provide better performance, they are generally prepared for use in the form of a compounded elastomer (i.e., a curable elastomer composition for vulcanization including a curable polymer, one or more fillers, and generally also a cure system). As such materials are processed, they form a network structure in the crosslinked rubber system that can negatively impact the ability to fabricate objects using layered FFF technology. There is a need in the art for development of such a technique as such networked structures offer the potential of finished products which should include strong interfacial bonding provided there was the ability to form them successfully with FFF or another additive technology.

It is further an issue in the art for development of additive processible compounds in the elastomer area that the processing characteristics of a fully compounded curable elastomeric composition are quite different from the processing characteristics of thermoplastics such as those noted above that are typically used in FFF processing. When attempting to introduce elastomers to additive manufacturing processes, particularly in the case of thermoset elastomers, in a curable compounded form, caution has to be taken to keep the materials below their cure temperature for the purpose of processing the material before curing it. Such materials when not heated present further challenges for processing as they have a high viscosity (a problem usually addressed by application of heat), and the need to prevent and hold off forming of crosslinks while processing and prior to intentional curing.

Feeding of flexible filaments using currently available three-dimensional printing equipment also poses a challenge due to such viscosity and cure-prevention needs, including preventing problems which arise due to buckling of the filament.

Fluorine-containing elastomers including both fluoroelastomers (FKMs) and perfluoroelastomers (FFKMs) are chemically- and plasma-resistant and can be used also in certain compositions suitable for high-temperature and high-pressure applications. They are employed in a variety of end applications, notably as sealing and gasketing components for use in pharmaceutical and semiconductor manufacture, where chemical- and/or plasma-resistance as well as material purity are desired traits, as well as oil-field and fluid handling applications due to their ability to withstand harsh chemicals and high temperatures and pressures. However, fluorine-containing elastomers are materials known in the art to be difficult to process, and generally require careful compounding to ensure they are well-blended in a compound and are not prematurely cured. They are also reasonably expensive to manufacture requiring cleanroom facilities in some cases, as well as extrusion followed by compression molding.

There is a need in the art for a method of processing soft elastomer materials, thermoset elastomers and other elastomeric materials not previously believed to be employed in additive manufacturing such as FFF or FDM, and particularly, to be able to more inexpensively form articles from fluorine-containing elastomers, which are known to be difficult and/or expensive to process and which have properties and processing challenges that otherwise support the currently held view in the art that such materials are not capable to be successfully processed using additive manufacturing.

BRIEF SUMMARY OF THE INVENTION

The invention includes an additive manufacturing method for forming a fluorine-containing elastomer article, comprising providing a filament formed of a curable fluoropolymer composition; providing an additive manufacturing printer having a drive mechanism and a printer nozzle; feeding the filament into an additive manufacturing printer through the drive mechanism and through a longitudinal passage defined by an interior wall of a support tube, wherein the support tube extends from a first end to a second end, and wherein the second end of the support tube is positioned to be in fluid communication with an inlet to a printer nozzle; applying heat to the filament and printing successive layers of the filament exiting an outlet of the nozzle onto a substrate using the additive manufacturing printer to form the fluorine-containing elastomer article.

In the method herein, the filament may be fed from a feed roller. The filament is preferably formed by extruding the curable fluoropolymer composition. The filament may be cooled prior to introducing the filament to the support tube. A cooling method may be applied prior to introducing the filament to the tube for stiffening the filament and reducing the possible buckling. The filament may be cooled prior to entering the drive mechanism.

In one embodiment, the filament, which includes the curable fluoropolymer composition is heated to a temperature that is sufficient for flow of the curable fluoropolymer composition within the printer apparatus and that is below a temperature at which significant curing occurs. For example, the filament may be heated to a temperature that is below a temperature corresponding to a time, T2, associated with the curable fluoropolymer composition as determined using a test method of ASTM D2084 on a rubber process analyzer (RPA), which test methods as are known in the art. Suitable RPAs are available commercially. One suitable RPA, e.g., is available from Alpha Technologies Company, as RPA Model 2000. Such a temperature allows for depositing of the filament onto prior layers within a time that is below T2 to prevent or avoid curing until curing is desired, e.g., during a post-cure heating step.

The curable fluoropolymer may be partially fluorinated or a curable perfluoropolymer. In such a method when the fluoropolymer is a perfluoropolymer, the filament may be heated to a temperature that is enables flow of the curable perfluoropolymer, and that is below the temperature at which significant curing occurs. For example, the start of curing for a perfluoropolymer may be shown by thermal analysis using a differential scanning calorimeter (DSC). Curing characteristics will vary substantially depending on the curable FKM(s) and/or FFKM(s) selected for forming the filaments and particularly due to the cure system being employed. Thus, a selected compound DSC curve may be consulted to determine the desired heating temperature.

In example embodiments, for certain types of materials, the curable fluoropolymer that is partially, substantially or fully fluorinated may be heated to a temperature of about 100° C. to about 250° C., and preferably a temperature of about 105° C. to about 200° C., and more preferably a temperature that is about 115° C. to 160° C., with the understanding that such temperatures would be adjusted depending on the compound and its cure system.

The heat is preferably generated by a heating mechanism in the additive manufacturing printer, preferably in the print head. The drive mechanism in the additive manufacturing printer preferably comprises a drive wheel and a support wheel, and the method may further comprise passing the filament through the drive wheel and the support wheel prior to entering the first end of the support tube. In an alternative embodiment, the first end of the support tube extends upwardly through the drive mechanism between the support wheel and the drive wheel to support the filament as it leaves a feed roller. The support tube wall may optionally define a side opening extending transversely through the support tube wall and the wall around the opening may be contoured to the shape of the drive wheel, wherein the method may then further comprise feeding the filament so that it contacts the drive wheel in the area of the side opening as the filament passes through the drive mechanism.

In a further embodiment, the drive mechanism may comprise geared drive rollers and method may further comprise feeding the filament through the geared drive rollers. The support tube may extend from below the geared drive rollers. A portion of the support tube may further extend above the geared drive rollers such that the method may further comprise feeding the filament through the portion of the support tube above the geared drive rollers and into the rollers. The method may also further comprise cooling the portion of the support tube that extends above the geared drive rollers.

In the method, the outlet of the nozzle preferably defines an opening that is preferably wider, as measured transversely across the opening, than an outer diameter of the heated filament as measured transversely before heating. The opening of the nozzle outlet in one embodiment may have a width, as measured transversely across the outlet opening in a widest dimension, that is about 10% to about 200% of the outer diameter of the filament as measured transversely before heating.

One portion of the nozzle that extends from a printhead of the printer, may have a length measured from an inlet to the portion of the nozzle to the nozzle outlet, as measured longitudinally along the nozzle portion, that is about 5 to about 20 times the diameter of the filament prior to heating. In another embodiment, the nozzle may have a length in the heated portion thereof, as measured longitudinally along the heated portion of the nozzle, that is about 1 to about 10 times an outer diameter of the heated filament. In such an embodiment, the nozzle filament formed of a curable fluoropolymer composition prior to heating may preferably have an outer diameter of about 0.2 mm to about 20 mm, and more preferably an outer diameter of about 1.0 mm to about 3.0 mm.

The additive manufacturing printer in the method may include a drive motor for operating the drive mechanism that provides sufficient torque to overcome friction between the filament and the additive manufacturing drive printer while providing sufficient pressure to extrude the material through the additive manufacturing printer and out the nozzle. In one embodiment, the drive motor is a stepper motor having a geared transmission, which may include at least one planetary gear, to increase the torque of the stepper motor.

The invention further includes an article formed by a heated filament comprising a curable fluoropolymer composition using an additive manufacturing apparatus, wherein the article comprises a fluoroelastomer. The additive manufacturing apparatus is preferably a fused filament fabrication apparatus. The curable fluoropolymer composition may include a curable fluoropolymer, and in one embodiment, the curable fluoropolymer is perfluorinated such that it is a curable perfluoropolymer and the article comprises a perfluoroelastomer. The curable composition may comprise at least one curable fluoropolymer and at least one curative. The composition may further comprise at least one filler. In one embodiment, the filament has a diameter of about 0.2 mm to about 3.0 mm, and preferably about 1.0 mm to about 2.0 mm.

In another embodiment the method further comprises analyzing a curable fluoropolymer compound using, e.g., DMA, parallel plate rheometry, or other method to estimate a storage modulus to determine, such as to optimize, printing parameters.

The invention also includes a curable fluorine-containing composition for use in an additive manufacturing composition, comprising a curable fluoropolymer having a functional group for reacting with a curative; and a curative capable of reacting with the functional group. The fluorine-containing composition preferably has a torque of about 0.78 dNm when it is about 10% cured to about 28.01 dNm when it is about 90% cured. Such torque may be measured by RPA in accordance with ASTM D2084 test methodology. In a preferred embodiment, the curable fluorine-containing composition is sufficiently tacky so as to self-adhere on a substrate, but is still able to be removable from a substrate while substantially retaining the structural integrity of the fluorine-containing material deposited on the substrate. In such an embodiment, the curable composition is preferably able to be processed without curing occurring or with partial curing to a degree greater than 0% but less than about 25% during printing using an additive manufacturing apparatus.

The fluorine-containing composition may comprise a curable fluoropolymer that is a curable perfluoropolymer. They may comprise one or more additional curable fluoropolymers or one or more additional perfluoropolymers. The composition may then further comprise one or more additional curatives to cure the one or more additional curable fluoropolymers or one or more additional perfluoropolymers.

The invention further includes an additive manufacturing apparatus capable of forming a three-dimensional printed article comprising an elastomer, the apparatus comprising: a printer drive mechanism configured to facilitate passage of a curable polymer filament passing through the printer drive mechanism; a drive motor in operable communication with the printer drive mechanism, wherein the drive mechanism comprises a geared transmission, which may include one or more planetary drive wheels; and a printhead comprising a nozzle having an inlet for receiving polymeric filament and an outlet for heated extrusion of a curable polymeric filament onto a substrate.

The printer drive mechanism of the apparatus may comprise a drive roller and a support roller, and the apparatus may further comprise a support tube situated to extend beneath the printer drive mechanism, wherein the drive roller is preferably positioned to contact a filament fed into the tube within the printer drive mechanism. The support tube may extend from a lower surface of the printer drive mechanism for communication between the printer drive mechanism and the inlet of the nozzle. The support tube has a first end preferably positioned above the printer drive mechanism and a second end which is preferably proximate to the inlet of the nozzle, wherein the support tube is preferably configured to support a filament passing through the first end of the support tube and exiting through the second end of the support tube. The support tube preferably has a longitudinally extending wall having an interior surface defining a longitudinal passage from a first end of the tube to a second end of the tube, and an opening extending transversely through the wall of the tube from the interior surface to an exterior surface of the tube, for facilitating direct contact between the drive roller and a filament passing through the longitudinal passage of the support tube. The first end of the support tube may be positioned to receive a curable polymer filament leaving a feed roller while avoiding buckling of the filament.

The apparatus may further comprise a pre-cooler for cooling the filament before the filament enters the printer drive mechanism.

The printer drive mechanism of the apparatus may be configured to facilitate passage of a curable fluoropolymer filament passing through the printer drive mechanism and the article may then comprise a fluoroelastomer. The printer drive mechanism may also be configured to facilitate passage of a curable perfluoropolymer filament passing through the printer drive mechanism and the article may then comprise a perfluoroelastomer.

The drive motor of the apparatus may be a stepper motor and the geared transmission may include planetary gears that are preferably configured to provide a torque of about 0.2 to about 4. It will be understood, however, that the torque may be adjusted for different printing conditions and nozzle configurations.

The outlet of the nozzle may be about 0.2 mm to about 20 mm, and preferably about 1.0 mm to about 3.0 mm.

In a further embodiment, the substrate may comprise a frictional surface to improve adhesion of non-tacky extruded curable polymer onto the substrate. Such a frictional surface may comprise, e.g., an adhesive.

The additive manufacturing apparatus is preferably capable of printing at a temperature of less than about 250° C., and more preferably at a temperature of less than about 200° C., and most preferably at a temperature of less than about 160° C.

The invention also includes an additive manufacturing apparatus capable of forming a three-dimensional printed article comprising an elastomer, the apparatus comprising: a printer drive mechanism configured to facilitate passage of a curable polymer filament passing through the printer drive mechanism, and comprising geared drive rollers; a drive motor in operable communication with the printer drive mechanism; a printhead comprising a nozzle having an inlet for receiving polymeric filament and an outlet for heated extrusion of a curable polymeric filament onto a substrate; and a pre-cooler for cooling the filament before it enters the printer drive mechanism.

In such an embodiment, the apparatus may further comprise a support tube situated to extend beneath the printer drive mechanism. The support tube may extend from below the geared drive rollers for communication through the support tube between the geared rollers of the printer drive mechanism and the inlet of the nozzle. The support tube may have a first end and a first portion positioned above the printer drive mechanism and a second portion which extends from below the geared drive rollers to a second end that is proximate to the inlet of the nozzle. The first portion of the support tube may be situated within or be part of the pre-cooler.

The first end of the support tube may be positioned to receive a curable polymer filament leaving a feed roller while avoiding buckling of the filament. The pre-cooler may have walls that define a cavity for receiving a coolant. The pre-cooler walls may also define a bore for allowing passage of the filament for cooling the filament before passing through the geared drive rollers. The printer drive mechanism may be configured to facilitate passage of a curable fluoropolymer filament passing through the printer drive mechanism and the article comprises a fluoroelastomer. The printer drive mechanism may further be configured to facilitate passage of a curable perfluoropolymer filament passing through the printer drive mechanism and the article comprises a perfluoroelastomer.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
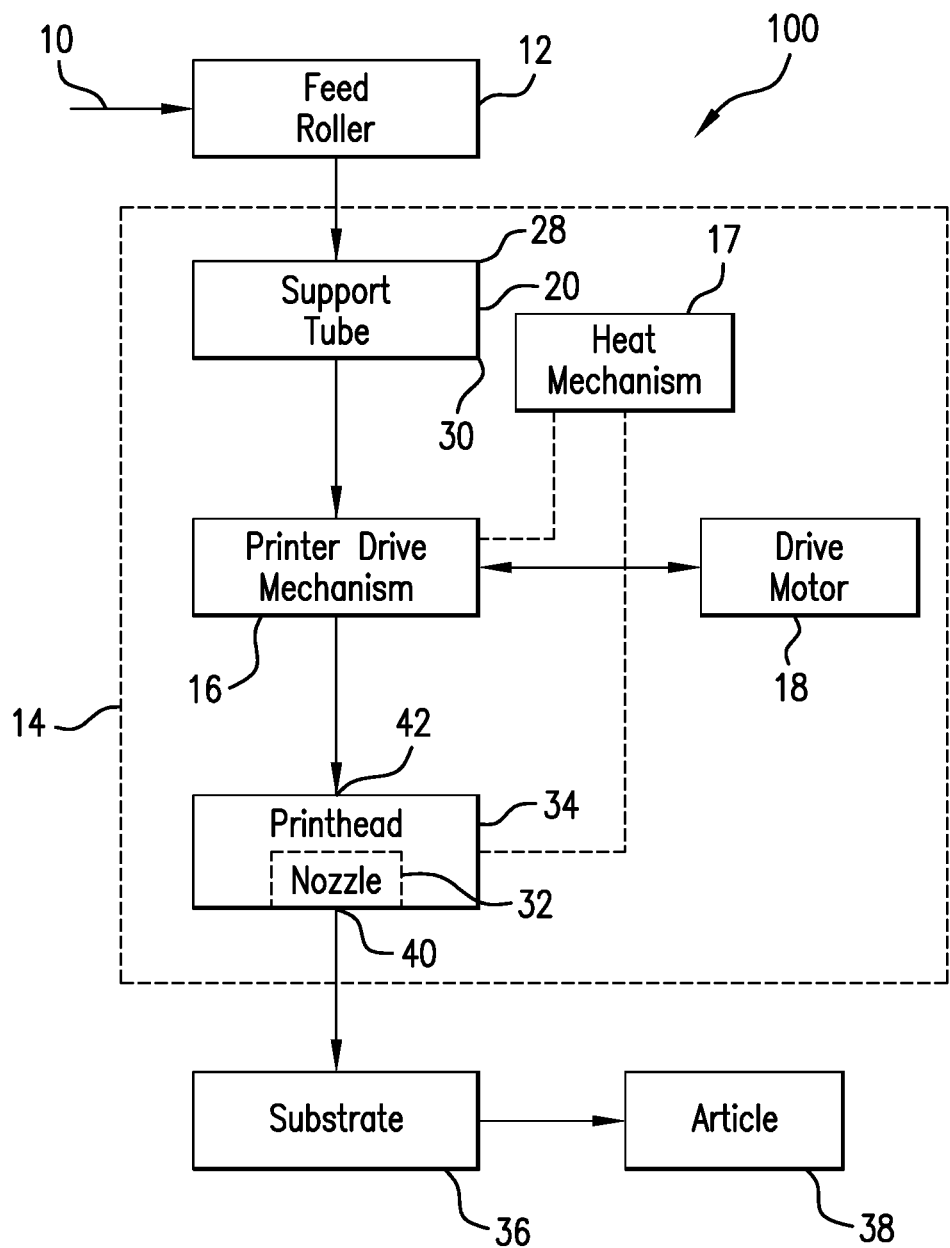
FIG. 1 is a schematic flowchart representation of an apparatus according to one embodiment of the invention.

The invention herein includes an additive manufacturing method for forming a fluorine-containing elastomer article, articles formed from a heated filament comprising a curable fluoropolymer composition extruded an additive manufacturing apparatus, and curable fluorine-containing compositions for use in an additive manufacturing composition, including a curable fluoropolymer having a functional group for reacting with a curative; and a curative capable of reacting with the functional group.

As used herein, "additive manufacturing" can include a variety of manufacturing techniques and apparatus suitable for preparing an article by depositing a heated material in layers on a substrate in a layer-by-layer manner to form an article. The methods, articles and compositions herein can be used in any of various additive manufacturing processes, including but not limited to three-dimensional printing, and material extrusion methods such as fused deposition modeling ("FDM"), fused-filament fabrication ("FFF") and direct pellet extrusion, among others. Preferably, the additive manufacturing process is a material extrusion method, such as FFF or FDM.

In FDM or FFF processes, e.g., the curable polymer compositions herein are preferably provided in the form of an extruded filament. A computer model of the article can be provided as is known in additive manufacturing and the computer model would represent the article as a plurality of layers or cross sections. The article is then formed in a layer-by-layer manner as the filament is fed to an extruding nozzle at the exit a typical additive manufacturing apparatus which provides heat to the filament and extrudes the heated filament for depositing it on a build platform or substrate to form a layer of the article based on the computer model of the article. Once deposited, the heated filament hardens so as to form a layer of the article. A subsequent layer of filament is deposited on the first layer of filament to form a subsequent layer of the article based on the computer model of the article. This process is repeated until all layers of the article are deposited so as to form the printed article. Once the article is complete, various finishing processes may be performed, such as a thermal cure of the article, or surface treatments, such as sanding to remove excess material.

When used in an additive manufacturing process to form a printed article as described herein, a curable fluoropolymer composition after printing is preferably crosslinked using a cure system and application of heat, such as by heating the composition to a temperature sufficient to induce initial curing of the curable fluoropolymer which creates some crosslinking of the material and/or to heat the composition to a temperature that substantially or fully crosslinks the composition at elevated temperatures upon formation of layers and/or during a post-cure step.

During processing through the apparatus and prior to passing through the nozzle, the filament is preferably only heated to a temperature sufficient to allow the curable fluoropolymer to flow through the apparatus, and to avoid or minimize curing of the fluoropolymer until a layer or layers are printed. During processing, it is preferred that the temperature allow for flow but is kept below a temperature at which curing does not occur or if initiated does not become too substantial. The curable fluoropolymer compositions as provided for use in an additive manufacturing process herein are flowable through the apparatus but are either not crosslinked or crosslinked only to some extent while entering into the heated nozzle in an FFF or FDM additive manufacturing apparatus.

Curing will continue after the layers are deposited during the formation of the individual layers in the additive manufacturing process. In FFF or FDM apparatus, the extrusion head or nozzle which may provide heat and allows for exit of the extruded filament may provide heat necessary to induce the crosslinking as the material exits, deposits and cures in the deposited layers. Such crosslinking during the additive manufacturing process is believed to help strengthen a finished article by improving interlayer adhesion in the article.

Once the printed article is fully formed by the additive manufacturing process, a final thermal cure step may also be taken in which the printed article may undergo further crosslinking or post-curing. The temperatures and times desired may be varied depending on the curable fluoropolymer selected as well as the degree of crosslinking desired and the presence or absence of any curatives, co-curatives and/or cure accelerators, as well as the degree of crosslinking that already occurred, if any, while the filaments passed through the additive manufacturing apparatus during an initial article formation step. Preferably, the majority of the curing of the curable fluoropolymer composition occurs during the final curing of the printed article through continued application of some level of heat or post-cure to the formed article.

Curing the curable fluoropolymer is believed to provide increased adhesion between layers of the printed article, which provides the printed articles with improved and more uniform mechanical properties, such as tensile strength and modulus while still providing the benefit of an elastomeric material to the article, including in instances where compression capability, strength, and resistance to chemicals, plasma, and high-temperature and/or high pressure conditions will be encountered for the printed article in use.

Other benefits of use of additive manufacture to print elastomeric articles includes improvement in manufacturing efficiency. Most elastomeric articles such as O-rings and gaskets encounter low yields from compression molding, particularly when attempting to make articles with more complex geometries. There are some instances where traditional compression molding limits the level of complex geometries achievable with such processes. Further with respect to most fluoroelastomer and perfluoroelastomer articles, there are high material costs for the initial curable fluoro- or perfluoropolymer such that flashing, lost pieces removed in molding and other issues contribute to higher manufacturing costs. Use of the precise nature of additive manufacturing three-dimensional printing reduces such process waste and can lower costs.

Further, the modifications introduced in the additive manufacturing process herein enable various commercially developed additive manufacturing apparatus to overcome challenges previously encountered in the art while attempting to form articles using thermoset and other softer and more viscous elastomers due to a lack of strength combined with a high viscosity in the extruded materials.

Such improvements allow for a resolution in preventing buckling of extruded filaments, printing in a controlled manner within unnecessary curing of the material during delivery from the apparatus nozzle, and issues that arise from friction in the apparatus interfering with the ability to extrude the material through the print head or nozzle of the apparatus as well as adhesion of extruded filament onto a receiving substrate surface.

In additive manufacturing processes using conventional polymers or certain thermoplastic elastomers as have been previously demonstrated, the layers of a printed article are joined primarily by the intermixing or melting of layers into one another by polymer diffusion. The curable fluoropolymer compositions of the present invention, as they are able to be extruded without premature curing when delivered in forming a printed article, allow for layers to join both by traditional interlayer adhesion as well as strengthening by continued curing and crosslinking as the article is printed layer-by-layer.

The curable fluoropolymer compositions herein may be used to form prototypes, parts and replacement parts for use in a variety of industries and in a variety of end applications, including oil and gas drilling and recovery, semiconductor processing, aerospace applications, seals and gaskets, structural brackets, automotive applications, medical devices, prosthetics and implants, construction materials, and consumer products, among others. For example, the curable fluoropolymer compositions may be formed into three-dimensional articles used to form packaging; sealing assemblies, such as O-rings, V-rings, U-cups, gaskets, bearings, valve seats, adapters, chevron back-up rings; tubing and other products.

The resulting articles, as they are formed from fluorinated or perfluorinated materials will also be solvent-, chemical-, and plasma-resistant, and enjoy good physical properties (tensile strength and modulus, e.g.) and elastomeric properties, thermal properties and compression set while being manufactured at a lower cost due to elimination of waste in materials.

In the method, a filament is provided that is formed to include a curable fluoropolymer composition. Such a composition includes one or more curable fluorine-containing polymers also referred to herein a curable fluoropolymers generally.

Curable fluorine-containing polymers for use herein may be any suitable curable fluorine-containing polymer formed of one or more curable fluorine-containing monomer, one of which has a functional group to permit curing by reacting with one or more curing agents in a curing system. Curable fluorine-containing polymers may be partially fluorinated curable fluoropolymers that upon curing form a partially fluorinated elastomer (also referred to herein as a fluoroelastomer) or can be substantially or completely fluorinated (i.e., perfluorinated) curable perfluoropolymers that upon curing form perfluoroelastomers.

For making parts intended for end applications that will be used in high purity or clean environments or for downhole applications in which harsh chemicals and high-temperatures and pressures are encountered, the at least one curable fluoropolymer is a preferably a curable perfluoropolymer that will be useful for forming a perfluoroelastomer. A composition herein, whether a curable fluoropolymer composition that is partially fluorinated or curable perfluoropolymer composition that is substantially or completely fluorinated, may include only one fluoro- or perfluoropolymer or may include two or more such fluoro- or perfluoropolymers in the composition which when used and/or cured to would form either an elastomer article having only a single fluoro- or perfluoroelastomer, or when two or more are used, would form an article having a blended perfluoroelastomer. Further curable fluoropolymers may be blended with curable perfluoropolymers to make partially fluorinated blended fluoroelastomers.

As used in this application, "perfluoroelastomer" or "cured perfluoroelastomer" unless otherwise indicated, includes any cured elastomeric material or composition that is formed by curing a curable perfluoropolymer(s) such as the preferred curable perfluoropolymers in the curable compositions described herein.

A "curable perfluoropolymer" (sometimes referred to in the art as a "perfluoroelastomer" or more appropriately a "perfluoroelastomer gum") that is suitable to be used to form a cured perfluoroelastomer is a polymer that is substantially completely fluorinated, and which is preferably completely perfluorinated, on its polymeric backbone. It will be understood, based on this disclosure, that some residual hydrogen may be present in some perfluoroelastomers within the crosslinks of those materials due to use of hydrogen as part of a functional crosslinking group. Cured materials, such as perfluoroelastomers are cross-linked polymeric structures.

The curable perfluoropolymers that are used in preferred perfluoroelastomeric compositions herein to form articles by additive manufacture that include cured perfluoroelastomers upon cure are formed by polymerizing one or more perfluorinated monomers, one of which is preferably a perfluorinated cure site monomer having a cure site, as noted above, i.e., a functional group to permit curing. The functional group may either be or may include a reactive group that may not be perfluorinated. Two or more curable fluoro- or perfluoropolymers, and preferably at least one optional curative (curing agent), may be preferably combined herein in a composition that is then cured forming the resulting crosslinked, cured fluoroelastomeric compositions, and preferably perfluoroelastomeric compositions as described herein.

As used herein, the curable fluorine-containing elastomeric compositions may be curable perfluoropolymer compositions which include only one curable perfluoropolymer or a blend of two or more such curable polymers in a composition, each of which, if perfluorinated, is formed by polymerizing two or more perfluorinated monomers, including at least one perfluorinated cure site monomer which has at least one functional group (cure site) to permit curing. Such curable perfluoropolymer materials are also referred to generally as FFKMs in accordance with the American Standardized Testing Methods (ASTM) standardized rubber definitions and as described above herein in ASTM Standard D1418-17, incorporated herein by reference in relevant part.

As used herein, "compression set" refers to the propensity of an elastomeric material to remain distorted and not return to its original shape after a deforming compressive load has been removed. The compression set value is expressed as a percentage of the original deflection that the material fails to recover. For example, a compression set value of 0% indicates that a material completely returns to its original shape after removal of a deforming compressive load. Conversely, a compression set value of 100% indicates that a material does not recover at all from an applied deforming compressive load. A compression set value of 30% signifies that 70% of the original deflection has been recovered. Higher compression set values generally indicate a potential for seal leakage. Articles formed using three dimensional additive manufacturing and a layer-by-layer forming process once fully cured can achieve elastomeric properties such as compression set, physical properties, such as tensile strength and tensile modulus, and chemical- and plasma-resistance properties suitable for use in at least the same end applications and environments in which perfluoroelastomers are currently employed in the art.

As described herein, the invention may include curable fluorine-containing elastomer compositions, including curable perfluoroelastomer or curable fluoroelastomer compositions, and molded articles formed from such curable fluorine-containing elastomer compositions.

Such perfluoroelastomeric compositions preferably include at least one, and more preferably two or more curable perfluoropolymers, preferably perfluoro-copolymers, at least one of which has a high content of tetrafluoroethylene (TFE). Other suitable co-monomers may include other ethylenically unsaturated fluoromonomers. If two such perfluoropolymers are used in a blend, and both preferably have TFE or another similar perfluorinated olefin monomer. Each curable perfluoropolymer may also preferably have one or more perfluoroalkylvinyl ethers (PAVEs), which include alkyl or alkoxy groups that may be straight or branched and which may also include ether linkages, wherein preferred PAVEs for use herein include, for example, perfluoromethylvinyl ether (PMVE), perfluoroethylvinyl ether (PEVE), perfluoropropylvinyl ether (PPVE), perfluoromethoxyvinyl ether and other similar compounds, with especially preferred PAVEs being PMVE, PEVE and PPVE. The PAVEs may be used alone or in combinations of the above-noted PAVE types within the curable perfluoropolymers and in the ultimate curable compositions so long as the use is consistent with the invention as described herein.

Perfluoropolymers are preferably co-polymers of TFE, at least one PAVE, and at least one perfluorinated cure site monomer that incorporates a cure site or functional group to permit crosslinking of the curable polymer. The cure site monomers may be of a variety of types with preferred cure sites noted herein. Preferred cure sites include those having a nitrogen-containing group, however, other cure site groups such as carboxyl groups, alkylcarbonyl groups, or halogenated groups having, e.g., iodine or bromine as well as other cure sites known in the art may also be used, particularly since additional curable fluoropolymers or perfluoropolymers beyond a first and/or second curable perfluoropolymer may be provided to the composition. The disclosure herein also includes use of radiation curing or use of a variety of preferred curatives (also referred to herein as crosslinking agents, curing agents), if other cure sites known in the art are used, other curatives that are capable of curing such alternative cure sites may also be used. For example, peroxide curing systems, such as those based on an organic peroxide, and related peroxide co-curatives may be used with halogenated functional cure site groups.

Exemplary cure site monomers are listed below and may be used in the curable fluoropolymer(s) or curable perfluoropolymer(s) described herein for use in the curable compositions, most of which are PAVE-based in structure and have a reactive site. Although the polymers may vary, preferred structures are those having the following structure (A):

$$CF_2=CFO(CF_2CF(CF_3)O)_m(CF_2)_n-X^1 \quad (A)$$

wherein m is 0 or an integer from 1 to 5, n is an integer from 1 to 5 and $X^1$ is a nitrogen-containing group, such as nitrile or cyano. However, carboxyl groups, alkoxycarbonyl groups or halogenated end groups may also be used as $X^1$.

The cure sites or functional groups $X^1$ noted herein, e.g., nitrogen-containing groups, include the reactive sites for crosslinking when reacted with a curative. Compounds according to formula (A) may be used alone or in various, optional, combinations thereof. From a crosslinking perspective, it is preferred that the crosslinking functional group is a nitrogen-containing group, preferably a nitrile group.

Compounds according to formula (A) may be used alone or in various, optional, combinations thereof.

Further examples of cure site monomers according to formula (A) include formulas (1) through (17) below:

$$CY_2=CY(CF_2)_n-X^2 \quad (1)$$

wherein Y is H or F, n is an integer from 1 to about 8.

$$CF_2=CFCF_2R_{f2}-X^2 \quad (2)$$

wherein $R_{f2}$ is $(-CF_2)_n-$, $-(OCF_2)_n-$ and n is 0 or an integer from 1 to about 5.

$$CF_2=CFCF_2(OCF(CF_3)CF_2)_m(OCH_2CF_2CF_2)_n OCH_2CF_2-X^2 \quad (3)$$

wherein m is 0 or an integer from 1 to about 5 and n is 0 or an integer of from 1 to about 5.

$$CF_2=CFCF_2(OCH_2CF_2CF_2)_m(OCF(CF_3)CF_2)_nOCF(CF_2)-X^2 \quad (4)$$

wherein m is 0 or an integer from 1 to about 5, and n is 0 or an integer of from 1 to about 5.

$$CF_2=CF(OCF_2CF(CF_3))_mO(CF2)_n-X^2 \quad (5)$$

wherein m is 0 or an integer from 1 to about 5, and n is an integer of from 1 to about 8.

$$CF_2=CF(OCF_2CF(CF_3))_m-X^2 \quad (6)$$

wherein m is an integer from 1 to about 5.

$$CF_2=CFOCF_2(CF(CF_3)OCF_2)_nCF(-X^2)CF_3 \quad (7)$$

wherein n is an integer from 1 to about 4.

$$CF_2=CFO(CF_2)_nOCF(CF_3)-X^2 \quad (8)$$

wherein n is an integer of from 2 to about 5.

$$CF_2=CFO(CF_2)_n-(C_6H_4)-X^2 \quad (9)$$

wherein n is an integer from 1 to about 6.

$$CF_2=CF(OCF_2CF(CF_3))_nOCF_2CF(CF_3)-X^2 \quad (10)$$

wherein n is an integer from 1 to about 2.

$$CH_2=CFCF_2O(CF(CF_3)CF_2O)_nCF(CF_3)-X^2 \quad (11)$$

wherein n is 0 or an integer from 1 to about 5.

$$CF_2=CFO(CF_2CF(CF_3)O)_m(CF_2)_n=X^2 \quad (12)$$

wherein m is 0 or an integer from 1 to about 4 and n is an integer of 1 to about 5.

$$CH_2=CFCF_2OCF(CF_3)OCF(CF_3)-X^2 \quad (13)$$

$$CH_2=CFCF_2OCH_2CF_2-X^2 \quad (14)$$

$$CF_2=CFO(CF_2CF(CF_3)O)_mCF_2CF(CF_3)-X^2 \quad (15)$$

wherein m is an integer greater than 0

$$CF_2=CFOCF(CF_3)CF_2O(CF_2)_n-X^2 \quad (16)$$

wherein n is an integer that is at least 1.

$$CF_2=CFOCF2OCF_2CF(CF_3))OCF_2-X^2 \quad (17)$$

wherein $X^2$ can be a monomer reactive site such as a halogen or alkylated halogen group (I or Br, $CH_2I$ and similar alkylated or alkoxylated reactive halogen groups and the like). Such curesite monomers may be at least partially fluorinated for use with curable fluoropolymers but are preferably perfluorinated along the portion of the backbone of the cure site monomer that lies in the polymer backbone chain when polymerized for use in curable perfluoropolymers.

Curable fluoropolymers that are non-perfluorinated fluoropolymers may also be used in the invention for us in making articles by additive manufacturing from fluoroelastomers. Such fluoropolymers (FKM) are materials classified by the Standard Rubber Nomenclature definitions provided by ASTM International in ASTM D1418-10a. Standard FKM polymers in accordance with such elastomer nomenclature typically have at least two monomers, one of which is fluorinated, and preferably all of which are fluorinated to some degree, with at least one curesite monomer for use in vulcanization. The at least two monomers preferably include vinylidene fluoride and hexafluoropropylene or a similar fluorinated olefin, but may include a variety of other monomers as well. The fluoroelastomer composition may also include at least one curing agent that is capable of undergoing a crosslinking reaction with a functional group in the curesite monomer(s) of the fluoroelastomer.

Such curesite monomer(s) may include a curesite monomer which is peroxide curable, and which may which includes a functional group comprising a halogenated material, such as Br or I in the curesite functional group. Such curesite monomers have a reactive functional group to permit cross-linking. While at least two of the monomers in an FKM are preferably hexafluoropropylene (HFP) and vinylidene fluoride (VF2), other typical monomers may be used in addition to these two for forming a variety of fluoropolymers known in the art.

The curable fluoropolymer may be radiation crosslinkable, but is preferably crosslinkable (curable) through a cure system wherein a curing agent(s) is/are added that is/are capable of reacting with a functional group in the curesite monomer for form an elastomeric material. For some curing systems, co-curing agents that work with the curing agent, or a second curing agent may be used. Optionally cure accelerator(s) may be employed as well. The compositions suitable for use in additive manufacturing herein may have a single curable fluoropolymer or a combination of at least two curable fluoropolymers, in the form of, for example, a polymer blend, grafted composition or alloy, depending on desired end properties.

The terms "uncured" or "curable," refer to fluorine-containing polymers for use in compositions herein, which have not yet been subjected to crosslinking reactions in any substantial degree such that the material is not yet sufficiently cured for the intended application.

The curable fluoropolymer for the compositions herein may optionally include additional such polymers in blend-like compositions or grafted and/or copolymerized compositions as noted above. Further, the polymer backbones may include a variety of curesite monomer(s) along the chain to provide one or more different functional groups for cross-linking. The compositions may also include curing agents and co-curing agents and/or accelerators to assist in the cross-linking reactions.

One or more curable fluoropolymer(s) and/or one or more curable perfluoropolymer(s) may be present in such compositions. Such polymers are themselves formed by polymerizing or co-polymerizing one or more fluorinated monomers. Various techniques known in the art (direct polymerization, emulsion polymerization and/or free radical initiated polymerization, latex polymerization, etc.) can be used to form such polymers.

An FKM fluoropolymer may be formed by polymerizing two or more monomers, preferably one of which is at least partially fluorinated. For example, HFP and VF2 may be combined with tetrafluoroethylene (TFE) or one or more perfluoroalkyl vinyl ethers (PAVE), or similar monomers along with at least one monomer which is a cure site monomer to permit curing, i.e., at least one fluoropolymeric curesite monomer. A fluoroelastomer composition as described herein may include any suitable standard curable fluoroelastomeric fluoropolymer(s) (FKM) capable of being cured to form a fluoroelastomer as well as one or more other curing agents as described herein.

Examples of suitable curable FKM fluoropolymers include those sold under the trade name Tecnoflon® PL958 and Tecnoflon®959 available from Solvay Solexis, S.p.A., Italy or other similar fluoropolymers. Preferably, the curable fluoropolymers used herein have suitable physical properties, but also have a rheology and viscosity that when employed in the applications herein and introduced into an additive manufacturing process, they can be extruded as filament for use, for example, in FFF or FDM. Other suppliers of such materials include Daikin Industries, Japan; Asahi Glass Company, Japan; 3M Corporation, Minnesota; S. V. Lebedev Synthetic Rubber Research Institute, Russia (VNIISK); and E.I. DuPont de Nemours & Company, Inc., Delaware, among others. Such FKM polymers are not fully fluorinated on the backbone of the polymer.

According to the invention one or more curing agents (also referred to herein as curatives) in a curing system are used. Suitable curatives include bisphenyl-based curatives, nitrile curatives and peroxide curatives and co-curatives, such as an organic peroxide and a co-curative. In the preferred embodiments herein with respect to FKMs, bisphenyl-based curatives cure through VF2 monomer groups preferably adjacent HFP monomers, and the peroxide-based curing system cures through reaction with a functional group on a curesite monomer in the curable fluoropolymer. Suitable nitrile curing systems as described above for FFKMs may also be used.

Preferred functional groups in the cure site monomers for reacting with peroxide curing systems include those having halogenated reactive groups, e.g., iodine or bromine, however, additional curesites may be provided to the same or a different cure site monomer such as those that might enhance, e.g., a bisphenyl-based curing as well, for example those that have a nitrile group, i.e., a nitrogen-containing reactive group.

In yet further embodiments, exemplary cure site monomers include those listed above which have a PAVE-based structure and a reactive site, such as structures noted above as structure (A) and variations (1) to (17) above.

Fluoropolymers for use in the compositions herein may be synthesized using any known or to be developed polymerization technique for forming fluorine-containing curable fluoropolymers by polymerization, including, for example, emulsion polymerization, latex polymerization, chain-initiated polymerization, batch polymerization and others. Preferably, the polymerization is undertaken so that reactive cure sites are located on at least one terminal end of the polymer backbone and/or are depending from the main polymer backbone.

One possible method of making the polymers includes radical polymerization using an initiator such as those known in the art for polymerization of fluorine-containing elastomers (organic or inorganic peroxide and azo compounds). Typical initiators are persulfates, percarbonates, peresters and the like, with preferred initiators being include salts of persulfuric acid, oxidizing carbonates and esters, and ammonium persulfate, with the most preferred being ammonium persulfate (APS). These initiators may be used alone or with reducing agents, such as sulfites and sulfite salts.

Standard polymerization procedures known in the art may be used. The cure-site monomer may be added and copolymerized when preparing the fluorine-containing elastomer. In their uncured or curable state, the fluoroelastomer compositions useful may include dual cure systems, such as having two curesite monomers with active functional groups in combination with more than one type of curative, e.g., at least one bisphenyl-based curative and an organic peroxide cure system, wherein the two curing systems are capable of undergoing a crosslinking reaction with one of the functional groups of the cure site monomers present on the fluoropolymer(s). In addition, if desired, additional curing agents or combinations of curing agents and co-curing agents may be employed particularly if additional curesite monomers are provided. Cure accelerators may also be used if desired. Halogen-containing functional groups as noted may above react with an organic peroxide curing agent and/or co-curing agent in the peroxide cure system.

When using a peroxide cure system, in an FKM fluoropolymer suitable curable fluoropolymers include polymers of VF2, HFP, and cure site monomers having a fluorinated structure with a peroxide-curable functional group, such as, for example, halogenated alkyl and other derivatives, and partially- or fully-halogenated hydrocarbon groups as noted above.

Curing agents for peroxide-based cure systems may be any organic peroxide curing agent and/or co-curing agent known or to be developed in the art, such as organic and dialkyl peroxides or other peroxides capable of generating radicals by heating and engaging in a cross-linking reaction with the functional group(s) of a curesite monomer on the fluoropolymer chain. Exemplary dialkylperoxides include di-tertbutyl-peroxide, 2,5-dimethyl-2,5-di(tertbutylperoxy) hexane; dicumyl peroxide; dibenzoyl peroxide; ditertbutyl perbenzoate; and di-[1,3-dimethyl-3-(tertbutylperoxy) butyl]-carbonate. Other peroxidic systems are described, for example, in U.S. Pat. Nos. 4,530,971 and 5,153,272, incorporated in relevant part with respect to such curing agents by reference.

Co-curatives for such peroxide curing agents typically include allyl compounds such as isocyanurates and similar compounds that are polyunsaturated and work with the peroxide curing agent to provide a useful cure, such as, for example, triallyl cyanurate (TAC); triallyl isocyanurate (TAIC); tri(methylallyl)isocyanurate (TMAIC); tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. The most preferred is well known in the art is triallyl isocyanurate (TAIC) which is sold under trade names such as DIAK®, e.g. DIAK® #7, and TAIC®, including TAIC® DLC.

As a bisphenyl-based curing agent, bisphenyl-based materials and their derivatives may be used, and preferably a curative such as Bisphenol A, BOAP, bisaminothiophenols, bisamidoximes, and/or bisamidrazones is used. However, additional curatives such as, monoamidines and monoamidoximes, triazines, cyano-group-containing nitrile curatives, organometallic compounds and their hydroxides, curing agents containing amino groups such as diamines and diamine carbamates, such as N,N'-dicinnamylidene-1,6-hexanediamine, trimethylenediamine, cinnamylidene, trimethylenediamine, cinnamylidene ethylenediamine, and cinnamylidene hexamethylenediamine, hexamethylenediamine carbamate, bis(4-aminocyclohexly)methane carbamate, 1,3-diaminopropane monocarbamate, ethylenediamine carbamate, trimethylenediamine carbamate, and curatives as described in U.S. Pat. Nos. 7,521,510 B2, 7,247,749 B2 and 7,514,506 B2, each of which is incorporated herein in relevant part with respect to the listing of various curatives for cyano-group containing fluoropolymers and the like may be used in addition to the bisphenyl-based curative and the peroxide-based curing system if desired and/or if additional curesite monomers are provided that are curable by such agents.

Bisphenyl-based curatives and derivatives thereof, including BOAP, Bisphenol A, Bisphenol AF and their salts and derivatives, bisaminothiophenols, and parabenzoquinone dioxime (PBQD) may optionally also be used in combination with the peroxide curing system. In addition to these curatives, other bisphenyl-based curatives and their derivatives as described in U.S. Pat. Nos. 7,247,749 and 7,521,510, incorporated in relevant part with respect to such compounds maybe used. Regardless of the type of bisphenyl-based curative used, it is most preferred that the compound has at least one and preferably two hydroxyl-containing functional reactive curesites for reacting with curesite monomers as noted above.

Each of the at least one cure site monomers in each of the curable fluoropolymers or perfluoropolymers herein is preferably present in an amount of about 0.01 to about 10 mole percent of the curable fluoropolymer. The ratio of the other monomer(s) in the fluoropolymers may be varied within the scope of the art for achieving different properties in the end fluoropolymers or perfluoropolymers.

The collective amount of curative used in a composition with a curable fluoropolymer or perfluoropolymer is preferably about 0.01 to about 10 parts by weight per 100 parts by weight of the curable fluoropolymer(s) in the composition Such curable fluoropolymer compositions and perfluoropolymer compositions may include various additives and fillers as are known for use in compounding fluorine-containing elastomers or new additives to be developed. Depending on the desired end properties, the fillers and additives in the composition aside from the curatives may be optionally added at amounts of about 0.5 parts to about 100 parts by weight based on the combined weight of the curable fluorine-containing polymers in the composition, and preferably about 10 parts to about 50 parts by weight based on the combined weight of the curable fluorine-containing polymers.

If desired, and although unnecessary, additives (other than the curatives noted above) may also be admixed such as by mixing or blending into the composition during compounding and prior to forming the extruded filament. Additives are optional and not required and, in some cases, may alter the viscosity properties such that conditions would have to be adjusted. However, if desired to for achieving certain elastomer performance properties, cure accelerators, curing co-agents, processing aids, plasticizers, fillers and modifiers such as silica, fluoropolymers (TFE and its melt-processible copolymers in micropowder form, pellet, fiber and nanopowder forms), fluorographite, silica, barium sulfate, carbon, carbon black, carbon fluoride, clay, talc, metallic fillers (titanium oxide, aluminum oxide, yttrium oxide, silicon oxide, zirconium oxide), metal carbides (silicon carbide, aluminum carbide), metallic nitrides (silicon nitride, aluminum nitride), other inorganic fillers (aluminum fluoride, carbon fluoride), colorants, organic dyes and/or pigments, such as azo, isoindolenone, quinacridone, diketopyrrolopyrrole, anthraquinone, and the like, imide fillers (such as polyimide, polyamide-imide and polyetherimide), ketone plastics (such as polyarylene ketones like PEEK, PEK and PEKK), polyarylates, polysulfones, polyethersulfones, polyphenylene sulfides, polyoxybenzoate, and the like may be used in amounts known in the art and/or which may be varied for different properties. All of the fillers herein may be used alone or in combinations of two or more such fillers and additives.

Preferably, any optional fillers are used in the amounts noted above and are less than about 100 parts per hundred parts of the combined curable fluoro- or perfluoropolymers in the composition. Desired curing times and temperatures that can be used to evaluate a heating curve for additive manufacturing may be developed based on the polymer composition prepared which should guide the selection for printing of properties that allow the polymer to be in the desired position D on the filament heating curve.

The invention further requires providing an additive manufacturing printer having a drive mechanism and a printer nozzle. Such additive manufacturing printers are commercially available for purchase, including from, e.g., under the names Ultimaker, available from Ultimaker BV in the Netherlands and Monoprice Maker, available from Monoprice in Brea, California. However, it should be understood that any such additive manufacturing printer that is capable of printing an elastomer article based on the disclosure herein may be used. Preferably such a printer would have one or more of the preferred features of the apparatus including the improvements described herein, or could be made directly by a manufacturer with alternative features provided it is capable of extruding a fluorine-containing curable fluoropolymer, partially, substantially or completely fluorinated so that a three-dimensional article comprising a fluoroelastomer or a perfluoroelastomer.

During the method, preferably after the filament enters the heated printhead including print nozzle and more preferably as the filament exits the nozzle, heat is applied to the filament to form a heated filament. While heat may be applied at any step in the process, (e.g., a heated filament may be pre-heated when entering the print drive mechanism, within the print drive mechanism, within the nozzle in the printhead or within the nozzle portion extending from the printhead to the nozzle outlet so that the heated filament is sufficiently hot to extrude the filament through the outlet of the nozzle), it is preferred that the filament is heated only so as to be flowable and not so hot as to initiate curing or to minimize any curing to avoid substantial curing prior to printing of a layer or layers. Preferably the filament is heated within the printhead and enters and travels through the nozzle and out the nozzle outlet as a heated filament.

In one preferred example, the filament at the roller prior to entering the path through the printer to the nozzle is cooled to stiffen filament and help prevent possibilities of buckling. Any suitable chilling or cooling method and apparatus may be used for this purpose and such mechanisms are known in the art, and a chilling or cooling apparatus may be incorporated into any embodiment described herein as described in further detail below.

Figure 6:
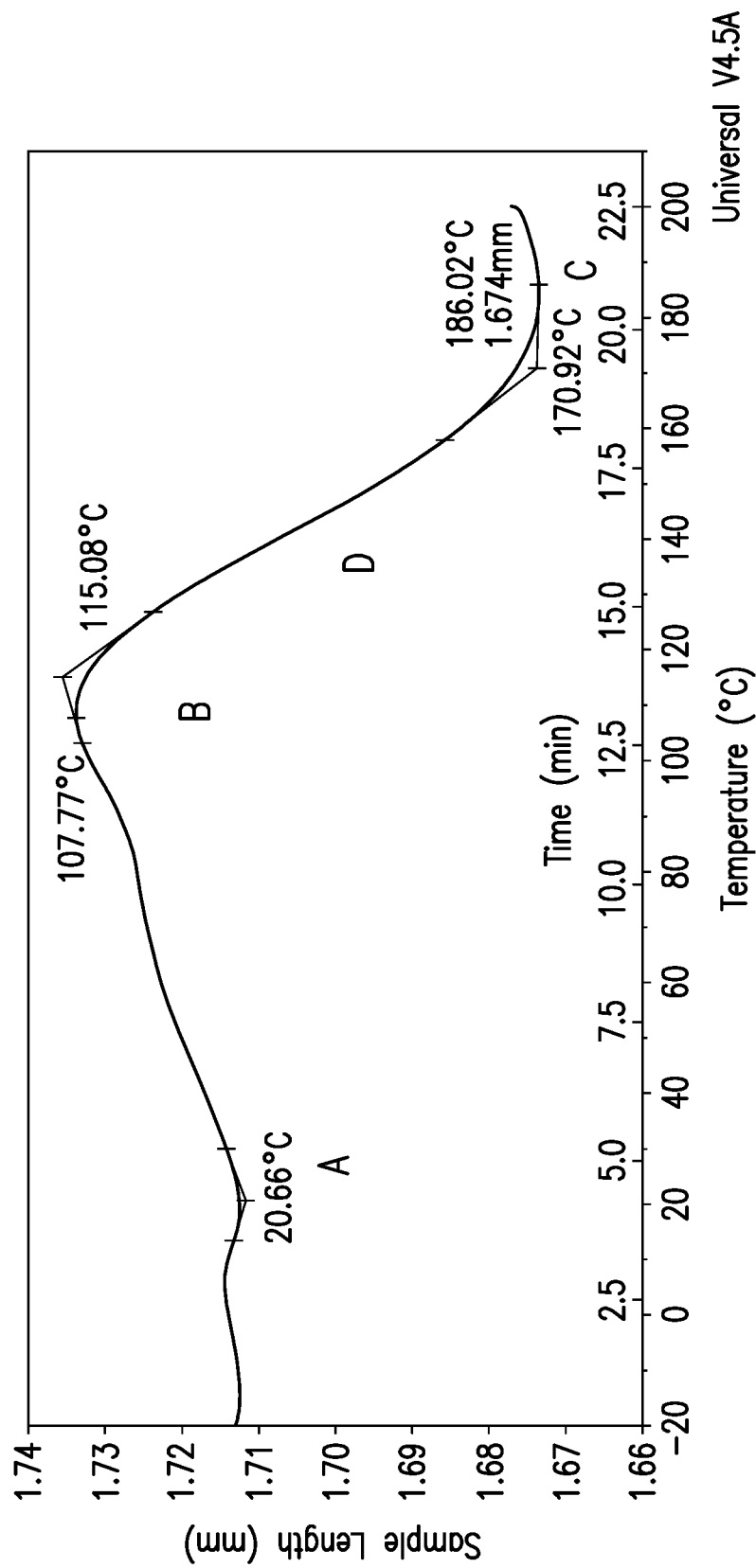
FIG. 6 is a graphical representation of filament length in mm over applied temperature for an extruded perfluoropolymer filament.

With reference to FIG. 6, showing a representative heat curve, the impact on filament width is shown as temperature increases for a representative curable perfluoropolymer. As the heat increases, filament thickness changes and gets wider (thicker) as the filament moves from a more ambient temperature (position A) to a level at which the curing (i.e., crosslinking) reaction begins (position B). As curing progresses and the temperature increases, the filament gets more attenuated and thinner in diameter hitting its thinnest level in position C where substantial curing has occurred. Based on the applicants' experimentation, it was determined that for processing, curing of the material should either be avoided or be less than about 25% of curing to provide sufficient strength to the material, but should not progress to be too substantial that the curing would inhibit the ability to flow the curable material, extrude it through the nozzle and allow for continued curing while making layer-by-layer deposition of the elastomer article. Position D was viewed as the ideal range in which to extrude the curable perfluoropolymer through the nozzle. Thus, it was also determined that the majority of commercial printers, which are designed for high-temperature melting, are not all suitable for use in additive manufacturing to form fluoro- or perfluoroelastomer articles. It is thus preferred to use an additive manufacturing apparatus that is capable of operating below 200° C., more preferably below about 250° C., more preferably below about 200° C., and further, more preferably at or below 160° C.

In using such an additive printer apparatus, it is further preferred that the curable perfluoropolymer be heated as an extruded filament in the process at a temperature that is prior to initiation of curing, or to the extent some curing occurs, it is minimized to a degree greater than 0 to about 25% of curing during printing. Evaluation of the cure characteristics of the curable fluoro- or perfluoropolymer may be made by RPA using the test method ASTM D2084 and then the temperature of the heated filament is preferably kept to a temperature that is below a temperature associated with the time T2 on the curve using RPA. Any suitable RPA may be used for this purpose, including the commercial example as noted above. In some embodiments, depending on the curable polymer used, the filament may be heated to a temperature of about 100° C. to about 250° C., preferably about 105° C. to about 200° C. and most preferably about 110° C. to about 160° C.

With reference to FIG. 1 which is a schematic flowchart representative of a general additive manufacturing apparatus for use herein, referred to herein generally as embodiment 100, the extruded filament 10 may be delivered in roll form from a feed roller 12. The feed roller can be any standard feed roller used for delivery of extruded polymeric filament.

The filament, which may be cooled at initial introduction, is fed into an additive manufacturing printer 14 through the printer drive mechanism 16 which is preferably operated by a motor 18. In the preferred embodiment shown, a support tube 20 extends between the printer mechanism between the drive rollers and the inlet 42 of the nozzle 36 in the printhead 34.

The support tube 20 may have a variety of shapes in transverse cross-section, such as circular, elliptical, oval, egg-shaped, square, triangular, polygonal and the like. Preferably, the support tube has some internally curved surfaces from its cross-sectional shape for ease of travel of the filament within the tube, such as a circular cross-sectional shape. The tube is formed of a longitudinally extending tubular wall 22 that has an exterior surface and an interior surface 24 that defines a longitudinally extending passage 26. The support tube extends from a first end 28 to a second end 30. Filament exits the additive manufacturing printer 14 and enters the printhead 32 including nozzle 34. In leaving the nozzle 34, the extruded filament being consistently extruded through the nozzle outlet 40 deposits the extruded filament 10 onto a substrate 36 and continues to move the printhead by a standard additive manufacturing computer assisted control (not shown) as are known in the art to form a layer-by-layer application of the material and form the elastomer article 38.

The second end 30 of the support tube is preferably positioned proximate (which herein is intended to mean within its scope, near, close to, in the general area of, juxtaposed or touching) an inlet to a printer nozzle for allowing for fluid (flowable) communication between the support tube at its second end and the printhead. The closer the tube comes from a practical standpoint, the more support the tube may give to the filament without encountering filament buckling. However, the actual closeness of the second end of the support tube to the inlet of the printhead and nozzle will be impacted on how close the design of the specific apparatus used allows the second end of the support to reach.

Successive layers of the heated filament exiting an outlet 40 of the nozzle 32 are printed onto a substrate 36 using the additive manufacturing printer 14 to form the fluorine-containing elastomer article 38.

The curable fluoropolymer and perfluoropolymer filaments provided to the additive manufacturing printer are preferably formed by extruding the curable fluoropolymer composition. Such extruders are known in the art and are used for forming "rope" of fluoropolymer for use in forming objects such as O-rings by compression molding. Such extruders can be used for preparing the extruded filament for use in the additive manufacturing process and are well known in the art.

Heat may be applied to some degree, at any time during the process, including prior to introducing the filament to the tube, for controlled curing and flowability, allowing the filament to flow through the process and out the nozzle while avoiding excessive or premature curing. Preferably application of heat, however, occurs within the printhead and as the filament is entering the nozzle to allow for extruded flow through the nozzle and outlet thereof. The filament may have a range of viscosities, provided it flows through the nozzle and curing is controlled. For example, a Mooney viscosity of about 10 to about 160 ML 1+10 at 121°.

Figure 8:
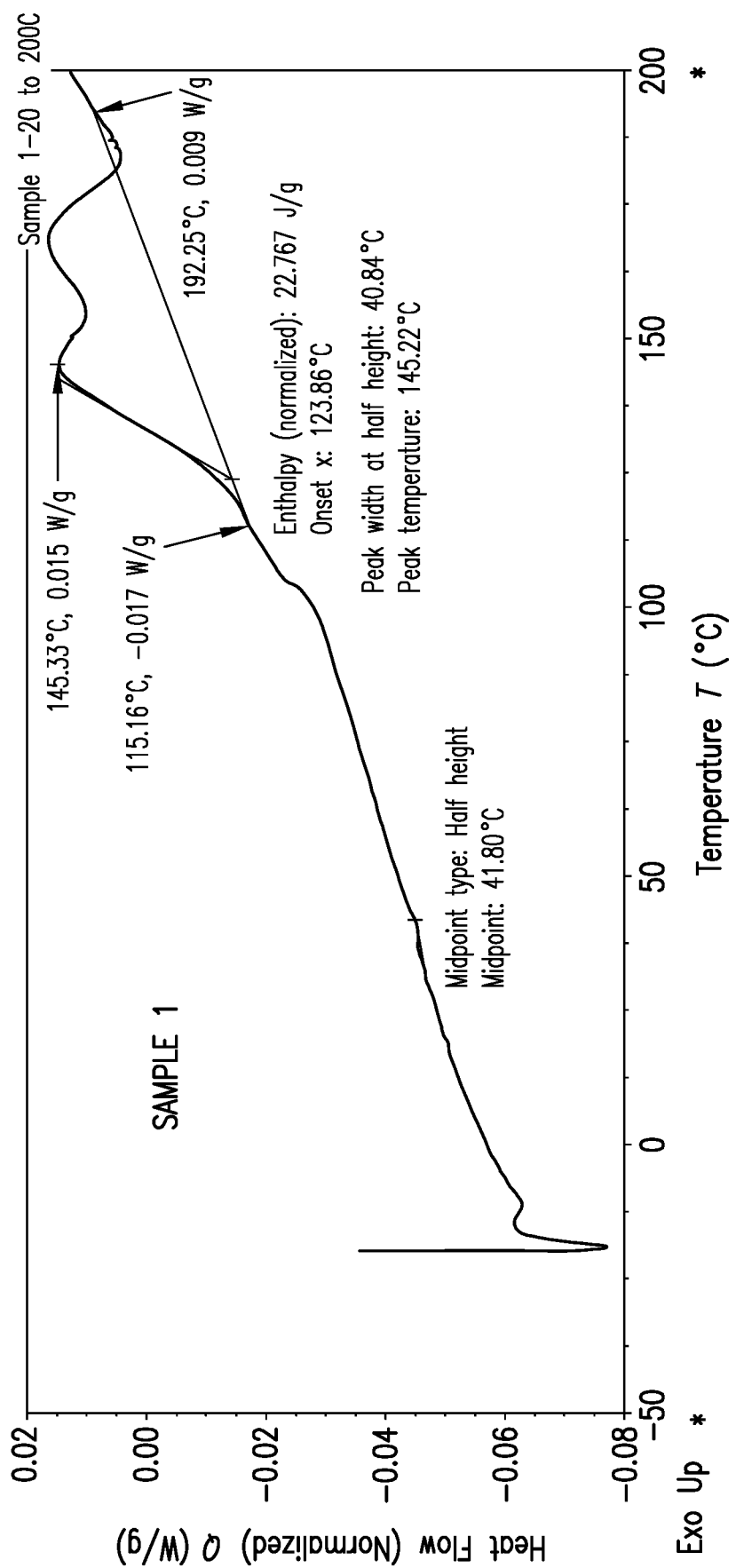
FIG. 8 is a differential scanning calorimeter graphical representation of the thermal behavior of the material in Sample 1.
Figure 9:
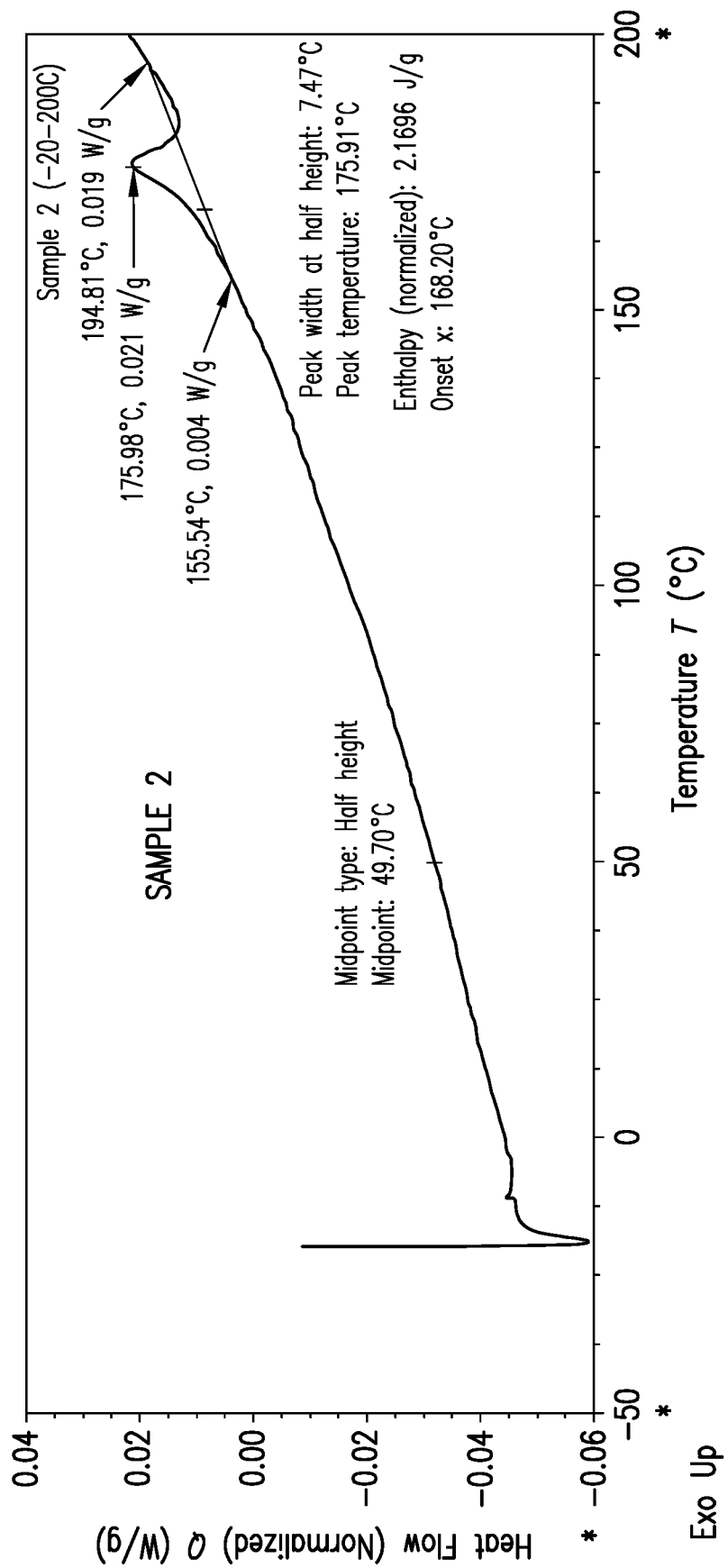
FIG. 9 is a differential scanning calorimeter graphical representation of the thermal behavior of the material in Sample 2.
Figure 10:
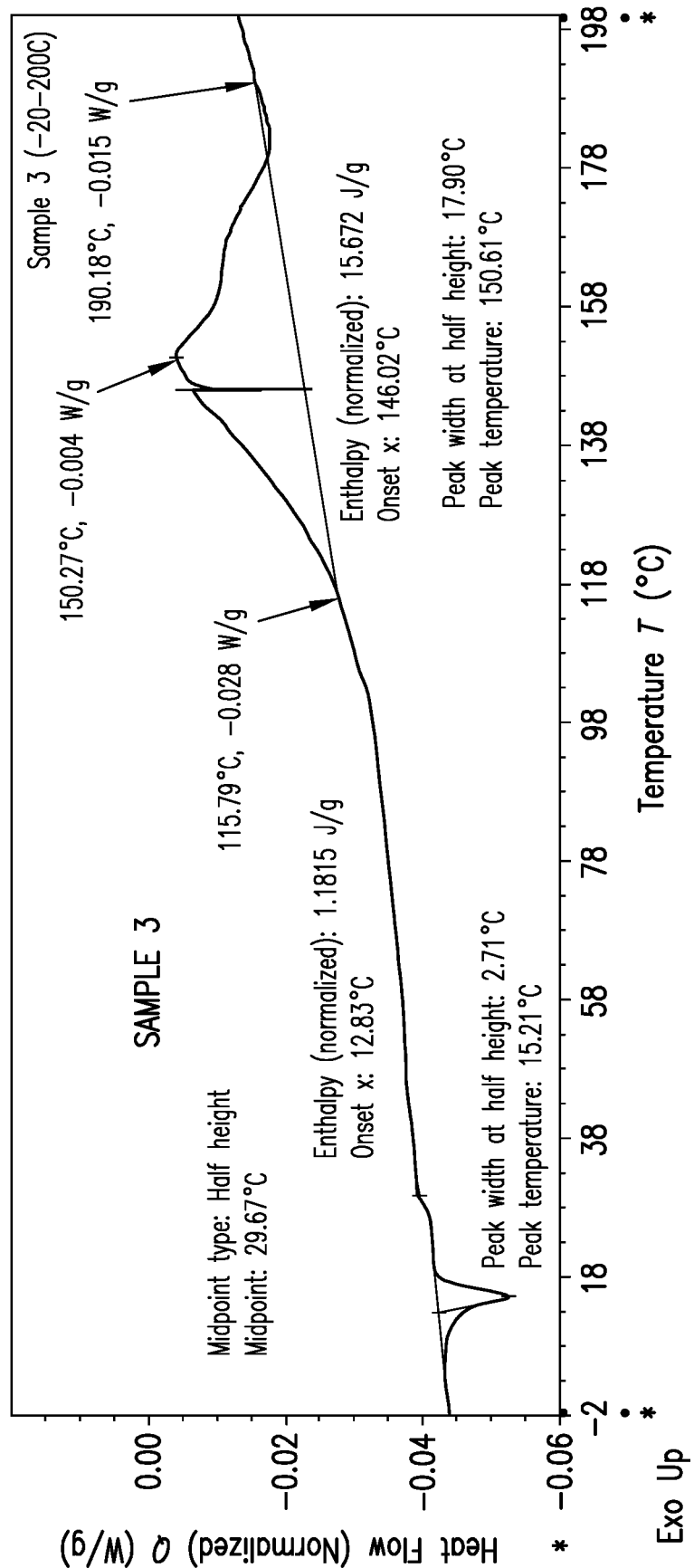
FIG. 10 is a differential scanning calorimeter graphical representation of the thermal behavior of the material in Sample 3.

The Figures illustrate this as discussed above where the position D is the ideal processing temperature range for extrusion through the nozzle. For various polymers where the temperatures for curing can vary, the temperature may be adjusted to accommodate the curing cycle of that polymer as shown in the preferred area of the curing curve in the representative curve in FIG. 6, and in the Example curves shown in FIGS. 8-10 related to Examples herein. The fluoro- or perfluoropolymer is preferably cured in and after the nozzle outlet to a degree of about 10% to about 90% as the article is formed and finalized, including any post-curing thereof.

The filament may be heated through any suitable heat mechanism 17 including an external heater, a heated fan or an optional heating mechanism in the additive manufacturing printer, preferably located a heating element located within the printer drive mechanism and/or the print head.

The apparatus in a preferred embodiment is described with reference to FIG. 1A in a schematic flowchart form. The preferred embodiment is referred to generally herein as embodiment 200 and like numbers indicate common elements in all embodiments. As shown, a curable fluorine-containing polymer filament is fed to the three-dimensional additive manufacturing apparatus 214 from a feed roller 212 to a printer drive mechanism 216 in the apparatus 214 that includes a drive wheel 244 and a support wheel 246. The two wheels move consistently through the drive motor 218 to support and provide friction to the curable fluorine-containing filament as it passes through the space 248 between the drive wheel 244 and the support wheel 248, which is defined by the desired contact gap for the filament thickness, prior to entering the first end 228 of the support tube 220.

In this embodiment, the apparatus may include the optional feature of having the first end 228 of the support tube 220 extend upwardly through the printer drive mechanism 216 between the support wheel 244 and the drive wheel 246 so that the support tube may further support the filament as is leaves the feed roller 212 and enters the printer drive mechanism to avoid buckling of filament at this point, particularly if any heat has already been applied, or from the heat of frictional contact of the filament and the apparatus after leaving the feed roller.

Figure 3:
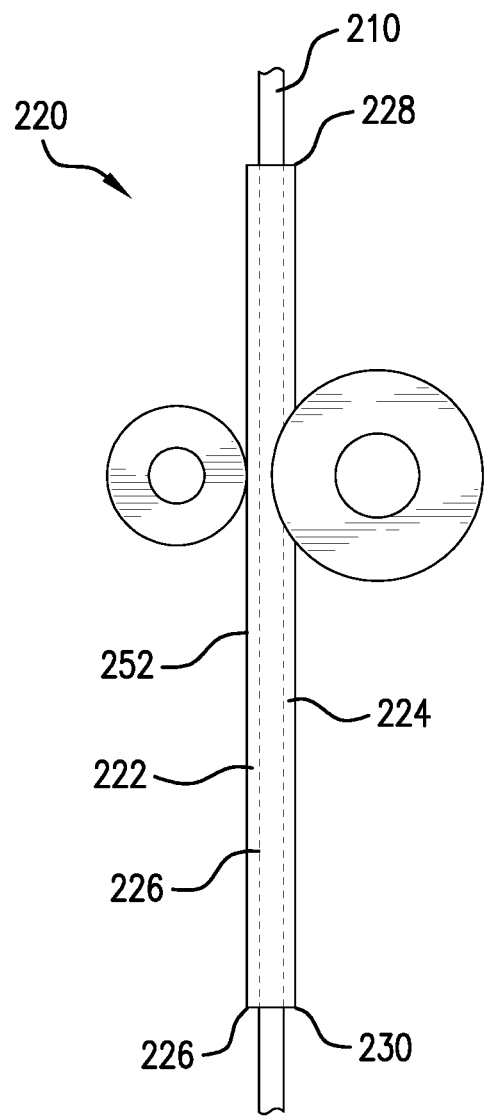
FIG. 3 is a side elevational view of a support tube between a drive wheel and support wheel with a polymeric filament extending therethrough for use in the apparatus of FIG. 2.
Figure 3A:
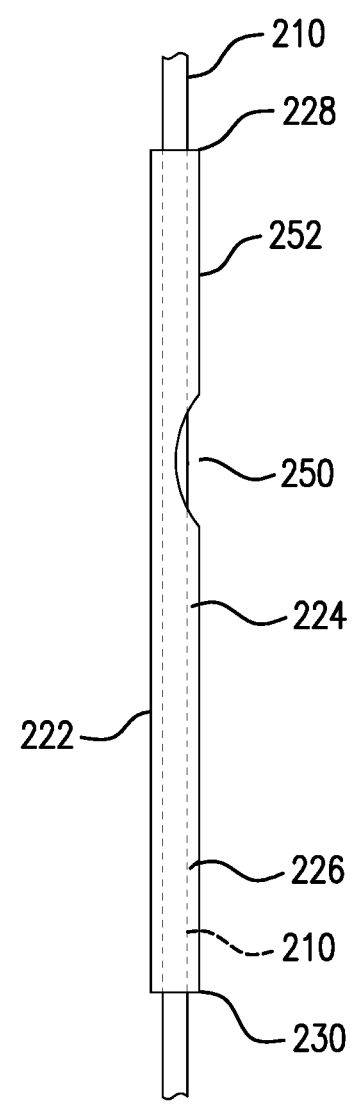
FIG. 3A is a side elevational view of the support tube of FIG. 3 absent the drive wheel and support wheel.

The support tube which may be used in such embodiment is shown in FIGS. 3 and 3A and differs from the support tube of embodiment 100 only with respect to the additional transverse opening discussed herein. Thus, the overall tube is otherwise the same.

The tube 220 is formed as a tubular wall 222 that has a longitudinally extending passage 226 defined by the interior surface 224 of the support tube wall 222. As fluorine-containing elastomers are being fed in an attempt to control when curing begins, the tube is preferably formed of a material that does not introduce unnecessary frictional contact along the entire path of the tube interior wall. Thus, the tube is preferably formed of a smooth material and preferably also a low friction material such as polytetrafluoroethylene (PTFE) or a moldable co-polymer of tetrafluoroethylene.

The support tube wall 222 also defines a side opening 250 that extends transversely through the support tube wall 222 from the interior surface 224 of the support tube wall 222 to the exterior surface 252 of the wall. The wall that defines and surrounds the opening 250 is contoured to the shape of the drive wheel 224. The filament 210 may be fed through the support tube so that while it is passing through a support tube that is preferably formed of a material that reduces friction in the process as noted above to avoid unnecessarily engaging curing too soon in the process. As the filament 210 passes through the passage 226 of the support tube 220, the transversely extending side opening 250 allows for controlled contact of the filament with the drive wheel 244 in the area of the side opening as the filament passes through the drive mechanism to keep the filament moving consistently and at a desired speed while minimizing the friction impact and supporting the filament using the support tube from above the printer drive mechanism (and from as close as the first end 228 of the support tube 220 can get to the feed roller 212) while maintaining a smooth filament introduction into the support tube thereby controlling the column height above the print drive mechanism and above the nozzle of the filament to allow for a smooth and controllable passage of a difficult-to-process elastomer such as a fluorine-containing elastomer through an additive manufacturing printer without sacrificing the important role of the printer drive roller in the printer drive mechanism in directing the filament into the printhead and controlling the speed of its approach.

Figure 4:
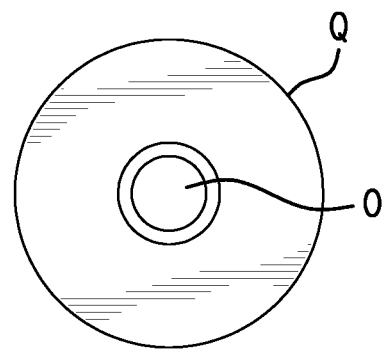
FIG. 4 is a bottom elevational view of a nozzle outlet of a prior art additive manufacturing printer.

In a further improvement, herein, due to the filament temperature profile, as shown in illustrative form in FIG. 6, when processing curable fluorine-containing polymers in an additive manufacturing apparatus, it is noted that elastomeric materials of this nature (and other similar viscous thermoset elastomers) require more pressure in leaving the nozzle outlet than standard printed thermoplastic filaments do. As shown in FIG. 4, a prior art print nozzle may be somewhat smaller than what is needed to accommodate filaments formed of extruded curable fluorine-containing polymer or other similar elastomer base polymers. Most standard additive manufacturing apparatus are not designed to handle the required degree of pressure to allow for the more viscous material (particularly as some curing is initiated) easily. A standard approach to increasing pressure on viscous thermoplastics is to heat them. However, too much heat on the curable fluorine-containing polymer or similar uncured elastomer base polymer can cause on-set curing, can weaken the filament at the wrong moment and/or can cause buckling at the inlet 242 of the nozzle 234 or blockage of the nozzle.

Figure 1A:
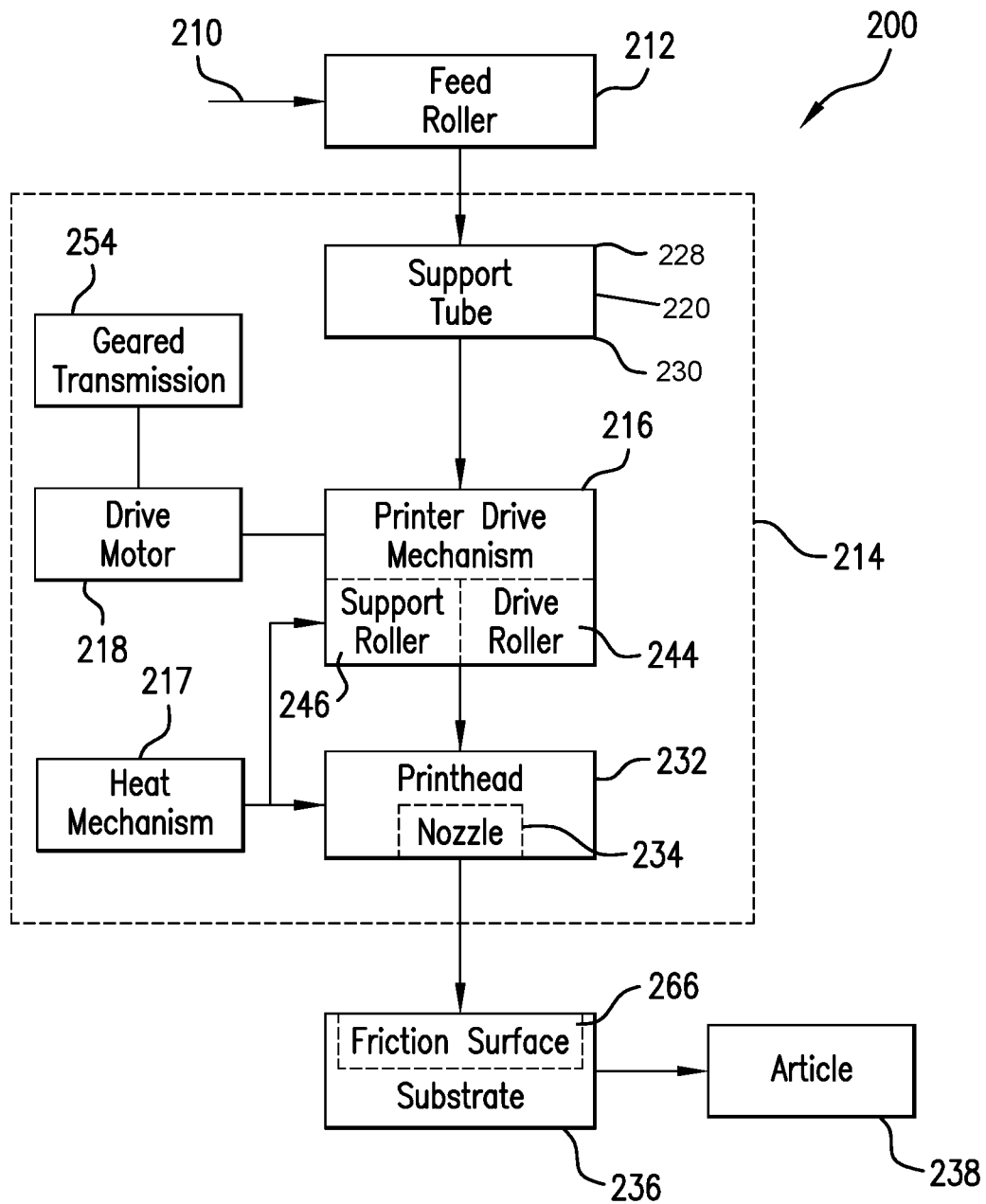
FIG. 1A is a schematic flowchart representation of a preferred embodiment of the apparatus of FIG. 1.
Figure 4A:
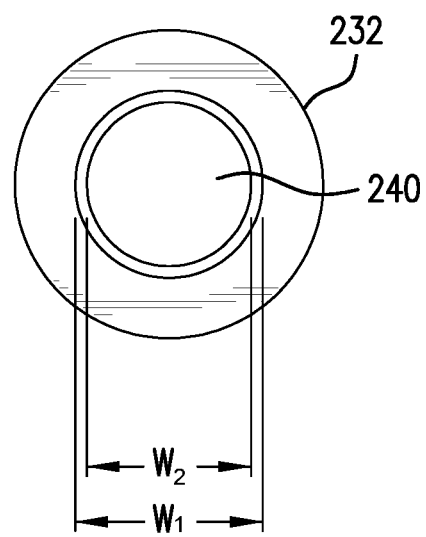
FIG. 4A is a bottom elevational view of a nozzle outlet for use in an apparatus according to a preferred embodiment of the invention.

Accordingly, in the embodiment of FIG. 1 or 1A, as shown with reference to FIGS. 4 and 4A, an outlet 240 of a nozzle 234 (or an outlet 40 in a nozzle 32) in preferred embodiments herein may be modified to be wider than the standard inner diameter (ID) of an outlet O of a nozzle Q of a standard prior art additive printer apparatus nozzle. The preferred outlet has an expanded inner diameter or width, $w_2$, measured transversely in the widest dimension of the outlet, and a correspondingly wider outer diameter or width $w_1$, so as to accommodate the maximum outer diameter of a heated fluorine-containing fluoropolymer filament at a stage in the heat curve (see FIG. 6 for example) in which the fluoropolymer is entering the preferred position D and wherein heat is controlled in the printer by a heating mechanism 217 in a manner that is the same as in embodiment 100. By using an outlet size that is approximately the same size or within a range of plus or minus about 0.1 mm to about 0.5 mm of the filament thickness of the filament based on its heat curve at the preferred processing temperature, the filament may extrude properly through the nozzle to allow for an uninterrupted extrusion, avoid blockage and prevent buckling at the entry of the printhead.

For example, as shown in FIG. 6, a filament formed of a curable perfluoropolymer composition in the preferred heating zone of position D has an outer diameter of about 0.2 mm to about 20 mm. Thus, the nozzle may be sized accordingly, e.g., it may be about 0.2 mm to about 20 mm, and preferably is about 1.0 mm to about 3.0 mm.

In preferred embodiments of embodiments 100 and 200, the additive manufacturing printer 14, 214 preferably include a drive motor 18, 218 for operating the drive mechanism that is a stepper motor. Such motor preferably provides sufficient torque to overcome any friction between the filament and the additive manufacturing drive printer and its components while providing sufficient pressure to extrude the material through the additive manufacturing printer and out the exit of the nozzle without losing constant speed and while avoiding blockages or filament buckling.

Figure 7:
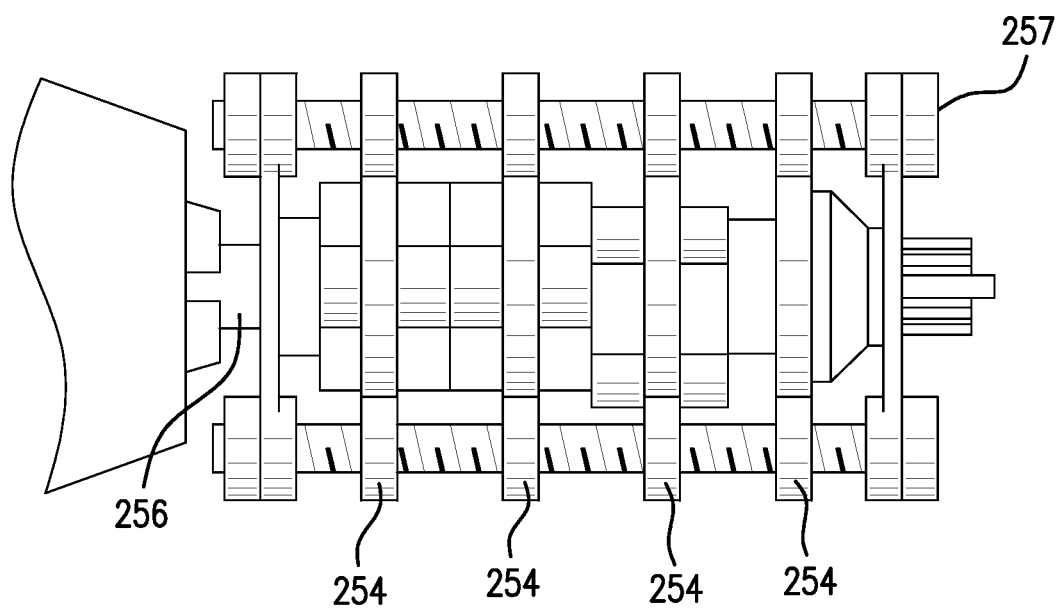
FIG. 7 is an example of a geared transmission for use in an embodiment herein.
Figure 7A:
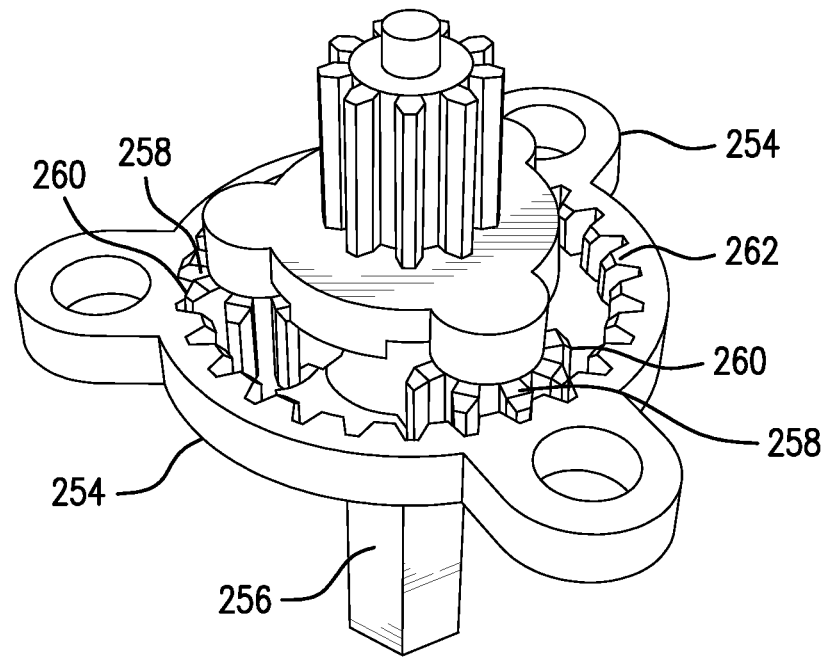
FIG. 7a is an example of a planetary gear for use in the geared transmission of FIG. 7.

As most standard additive printers have stepper motors designed for less viscous materials that are easily extrudable, the drive motor even if a stepper motor is used, is likely to have insufficient torque for smooth movement of the filament and to require additional power for operation. Thus, the additive manufacturing printer should have a larger capacity stepper motor and/or be modified to achieve the required torque and power requirements for operation when printing elastomer materials that are more viscous and/or need to be maintained at a constant speed and thickness to achieve a printed elastomer article. One preferred modification herein is to provide a geared transmission 257 to an additive printer drive mechanism's stepper motor to increase the torque of the stepper motor. An example of a geared transmission may include one or more planetary gears 254. Such a geared transmission 257, including a planetary gear 254 is shown in FIGS. 7 and 7A. In FIG. 7A, a single planetary gear 254 is shown which is affixed to the stepper motor 218 drive shaft 256 as a geared transmission 257. A connecting series of smaller gears 258 having edge teeth 260 are rotationally positioned to interact with an internally mating teeth 262. A series of such planetary gears 254 may be used in series in an interconnecting manner to adjust and enhance a standard drive motor torque of a commercial additive manufacturing printer. Table 1 below shows the increase in torque and other properties for a modified stepper motor using the configuration of FIG. 7 in comparison with the same motor prior to modification.

TABLE 1

| Features | Standard Additive Apparatus Motor | Modified Motor |
|---|---|---|
| Motor Type | Bipolar Stepper | Bipolar Stepper |
| Step Angle | 1.8° | 0.35° |
| Holding Torque | 0.46 Nm | 1.68 Nm |
| Rated Current/Phase | 1.7 A | 1.68 A |
| Phase Resistance | 2.1 ohms | 1.65 ohms |
| Recommended Voltage | 9-42 V | 12-24 V |
| Inductance | 4 mH | 3.2 mH + 20% (1 KHz) |

The invention also includes an article formed by a heated filament comprising a curable fluoropolymer composition extruded through a nozzle of an additive manufacturing apparatus. The apparatus may include the features as set forth above and as shown in an assembled manner in FIG. 2. The additive manufacturing apparatus 14, 214 is preferably a fused filament fabrication apparatus or a fused deposition apparatus for FFF or FKM devices.

Various curable fluorine-containing compositions may be used and formed into three-dimensional articles in an additive manufacturing composition herein and may include one or more of the curable fluorine-containing polymers, including fluoropolymers that are partially fluorinated (FKMs) and substantially or completely fluorinated perfluoropolymers (FFKMs) each having a functional group for reacting with a curative; and further include one or more curatives suitable for curing those polymers selected which are as described above that is/are capable of reacting with the respective functional group or groups on the curesite monomer(s) of the fluoropolymers selected. Preferred fluoropolymers and perfluoropolymers for additive manufacturing in the apparatus as described above have an uncured Mooney viscosity of about 10 to about 160 ML 1+10 at 121° C.

The invention further includes an additive manufacturing apparatus as noted above that are capable of forming a three-dimensional printed elastomer articles. The printer drive mechanism of the apparatuses herein may include in preferred embodiments a drive roller and a support roller as described above, and the apparatus may further include a support tube as described herein which is situated so as to extend beneath the printer drive mechanism, so that the drive roller is preferably positioned to contact the extruded filament fed into the tube within the printer drive mechanism. The support tube thus may extend from a lower surface such as lower surface 264 of the printer drive mechanism to an area Y proximate the inlet 242 of the nozzle 234 through the printhead 232 as shown in FIG. 2.

The support tube may have its first end 228 preferably positioned above the printer drive mechanism 216 and its second end 230 is preferably proximate to the inlet of the nozzle 234. Also, as described more fully above, the support tube 220 is preferably configured to support a filament of a curable fluorine-containing polymer passing through the first end 228 of the support tube and exiting through the second end 230 of the support tube, and may include a side opening as described above extending transversely through the wall of the tube from the interior surface to an exterior surface of the tube, for facilitating direct contact between the drive roller and filament passing through the longitudinal passage of the support tube. Also, as noted above, in one preferred embodiment, the first end 228 of the support tube 220 may be positioned closer to the feed roller to reduce column height so as to receive a curable polymer filament leaving the feed roller and avoiding buckling of the filament.

In a further embodiment, the substrate 236 may comprise a frictional surface to improve adhesion of non-tacky extruded curable polymer onto the substrate. As curable fluoropolymers include tetrafluoroethylene and are highly inert, creating a tacky or frictional finish or upper surface on the substrate 236 such as friction surface 266 may improve the results in forming the finished article. While interlayer adhesion can be improved by the cure process, initial adhesion to the substrate 236 is important to laying a strong first layer upon which to build the article that is stable and accepts the subsequent layers. Such a frictional surface may comprise, e.g., an adhesive, a roughened surface, a treatment that attracts or has a minimal amount of bonding agent, or a PTFE-containing surface that may somewhat interact with the first print layer.

Figure 2:
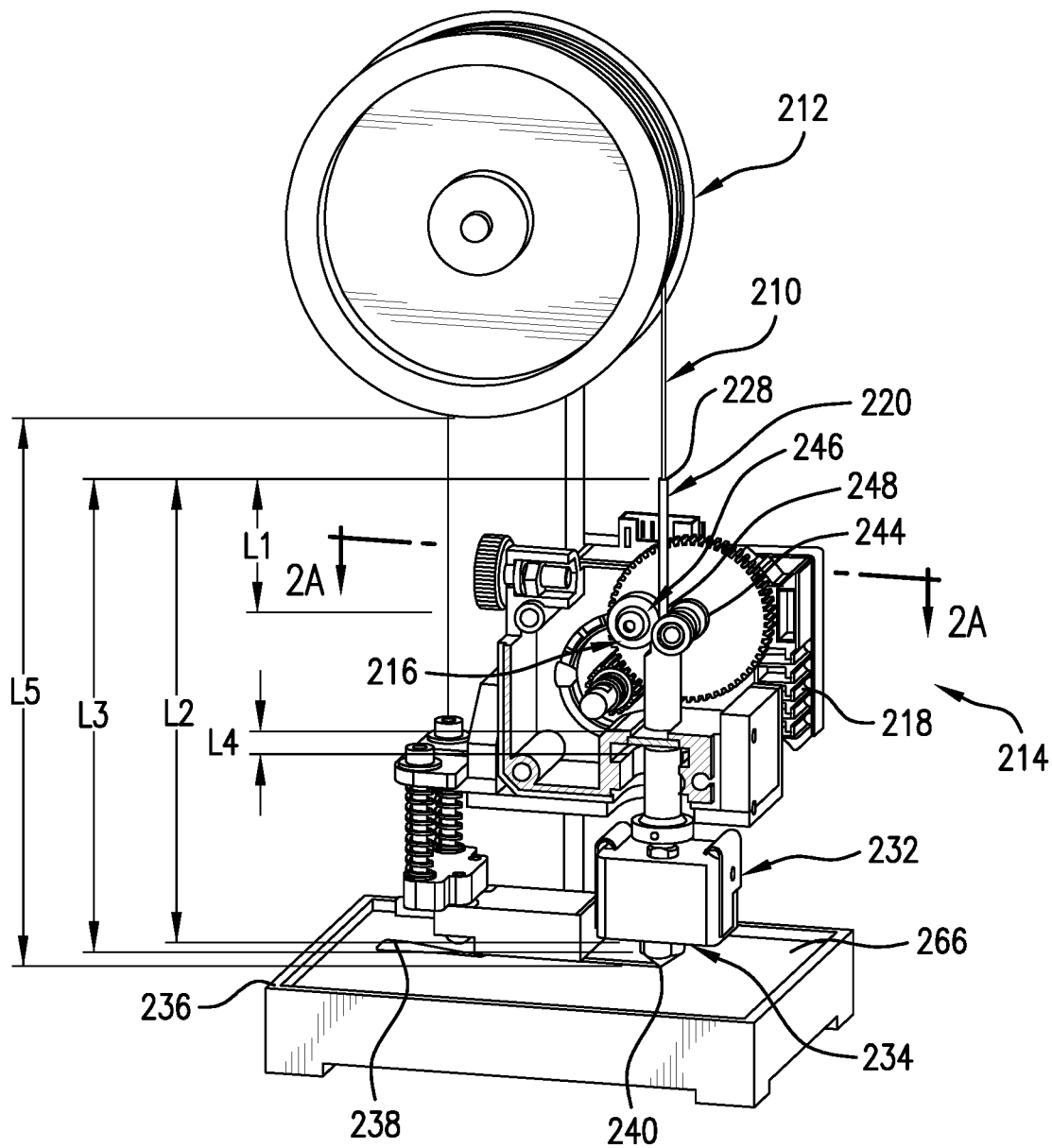
FIG. 2 is a perspective view of an apparatus according to a preferred embodiment of the invention herein.
Figure 2A:
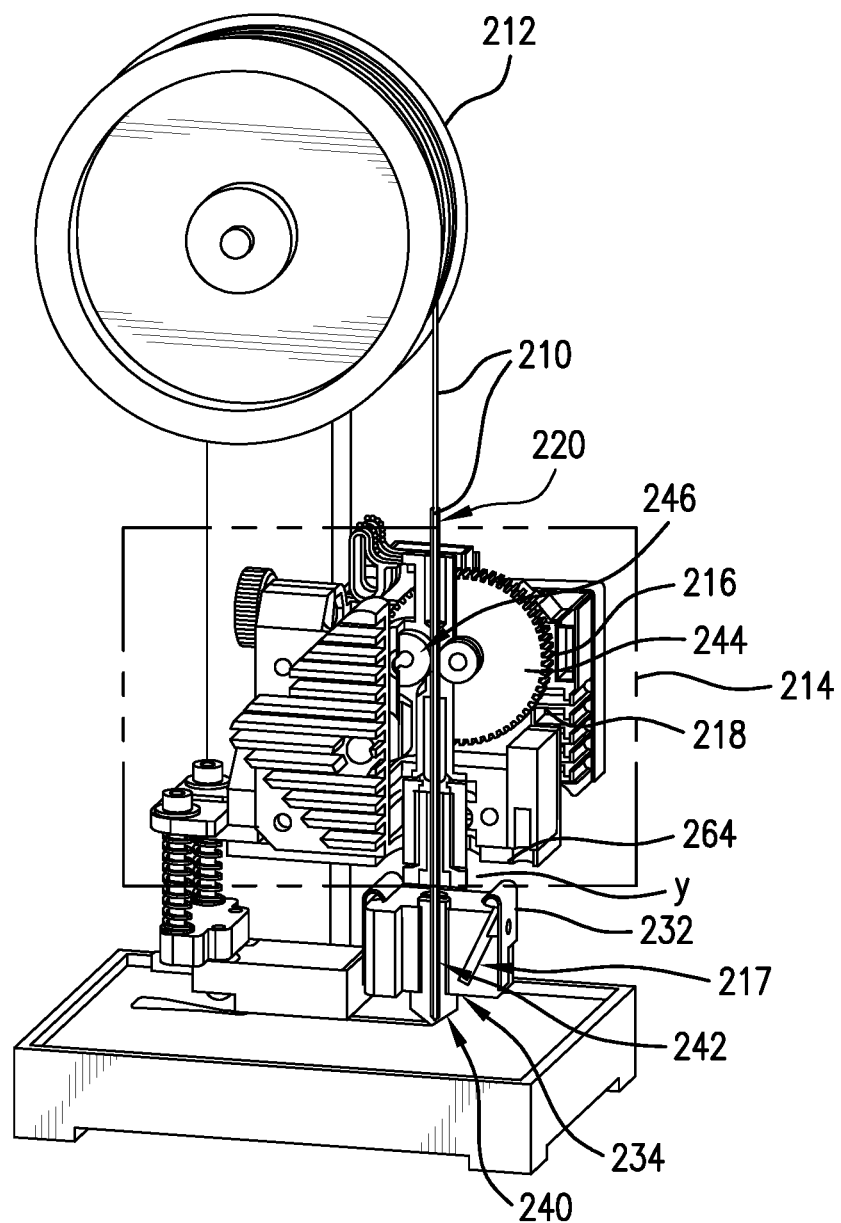
FIG. 2A is a longitudinal cross-sectional view of a portion of the apparatus of FIG. 2 taken along lines 2A-2A.

As shown in FIG. 2, the support tube has a length $I_1$ above the print drive mechanism as measured in the longitudinal direction, and also extends beneath the print drive mechanism having a length from the bottom surface 264 of the print drive mechanism to the top area Y proximate the printhead 232 having the nozzle inlet 242 is 4. The distance from the substrate to the bottom of the feed roller 212 represents the entire length of the filament path from roller to extrudate contact with the substrate and is represented as $I_5$. The distance from the first end of the support tube to the location in the printhead where the filament enters the nozzle is $I_2$ and the length measured from the top of the support tube to the nozzle outlet is $I_3$. The difference between $I_3$ and $I_2$ represents the nozzle height. The difference between $I_3$ and the combined lengths of $I_1$ and $I_4$ is the height of the print drive mechanism. The height of the upwardly extending tube is preferably selected to closely match the distance from the drive gear in the geared transmission to the heat break, i.e., the area where the filament enters the heated printhead. The specific distance is selected by the sizing of the drive gears in the geared transmission, the motor, and related transmission packaging. While lesser distances are preferred, the use of the upwardly extending tube provides sufficient support for the filament to perform in and successfully move through the three-dimensional printing apparatus.

Figure 11:
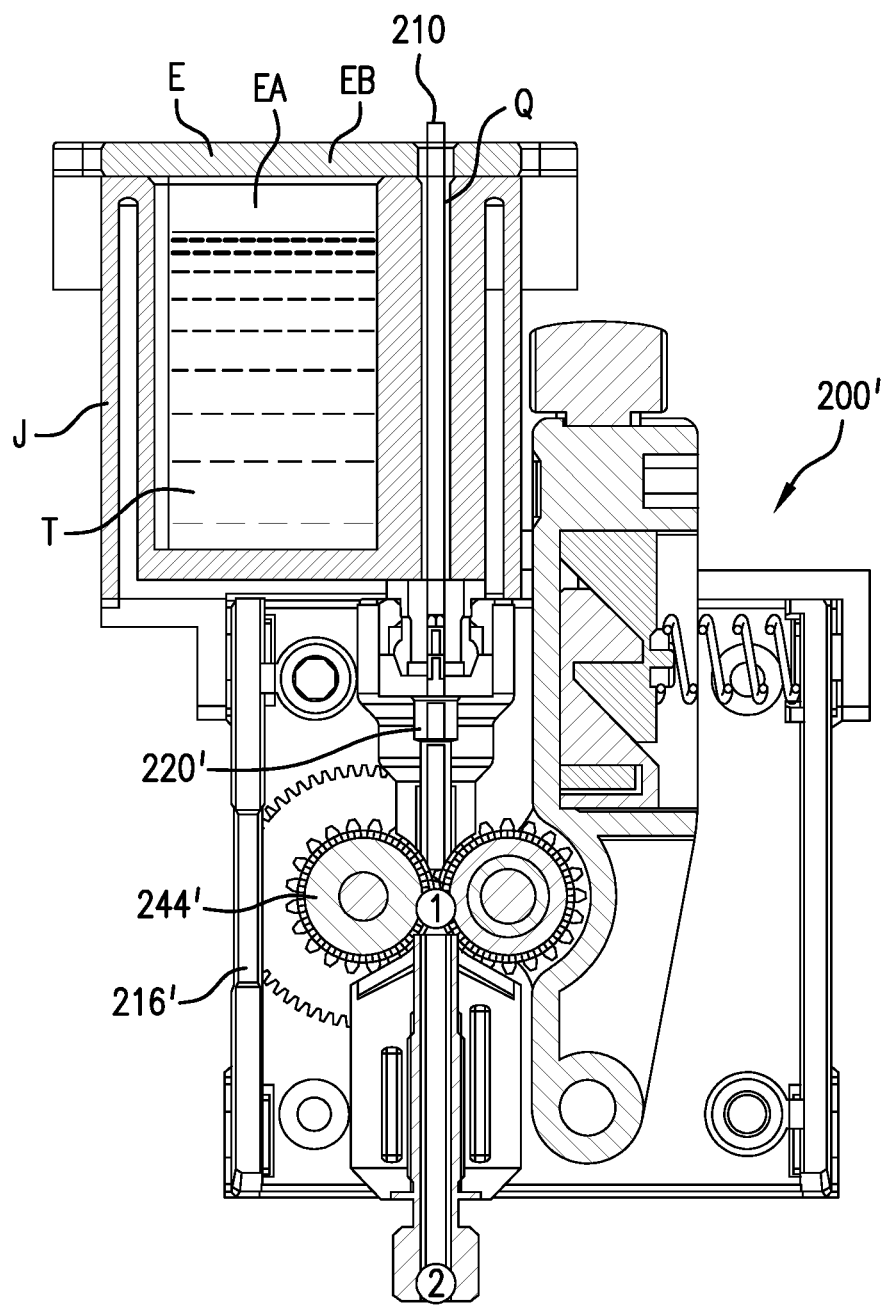
FIG. 11 is a cross-sectional view of a cooling apparatus as in FIG. 11A taken along lines 11-11 used in conjunction with an apparatus according to one embodiment of a printer drive mechanism within a printing apparatus herein.

As noted above, in the various embodiments described, a cooling or chilling apparatus may be provided at the outset of the process to achieve various benefits in additive manufacturing of curable fluorine-containing polymeric materials. For example, a chilling or cooling apparatus E in the form of a pre-cooler is shown in FIG. 11 may be provided. The pre-cooler E is shown as a multi-walled vessel J mounted above a printed according to embodiment 200, but with a somewhat modified drive mechanism 216' for use within an additive printed such a printer 214' in an embodiment 200' herein. Such drive mechanisms can be part of a filament extruder as well. The filament 210' shown in FIG. 11 is provided to a support tube 220' through a bore Q defined by the multi-walled vessel J. As shown the bore Q is preferably round in transverse cross-section, but may be modified in shape for operational or design purposes. The bore allows for smooth passage to the support tube while also allowing the filament 220' to pass through the cooled wall and bore Q in the pre-cooler E. As the filament passes, the filament temperature approaches the temperature of a coolant such as coolant within a cooling chamber EA also defined by and within the structure of the multi-walled vessel J. A removable cover EB may be provided if desired for cleaning, filling and/or replacement of coolant T.

Coolants used may vary, including mixtures of calcium chloride hexahydrate and ice to achieve a temperature of about −40° C. However, dry ice, regular ice, and others may be used depending on the temperature reduction and desired end conditions. The pre-cooler E may be filled intermittently, such as by optional cover EB, or continuously such as by introducing coolant through a continuous exchange feed, such as running coolant through an exchanger designed for cooling. Preferably with fluorinated materials as described herein the pre-cooler is continuously filled and kept at a preferred low temperature of about −40° C., but the temperatures may be varied according to the material selected.

Figure 12:
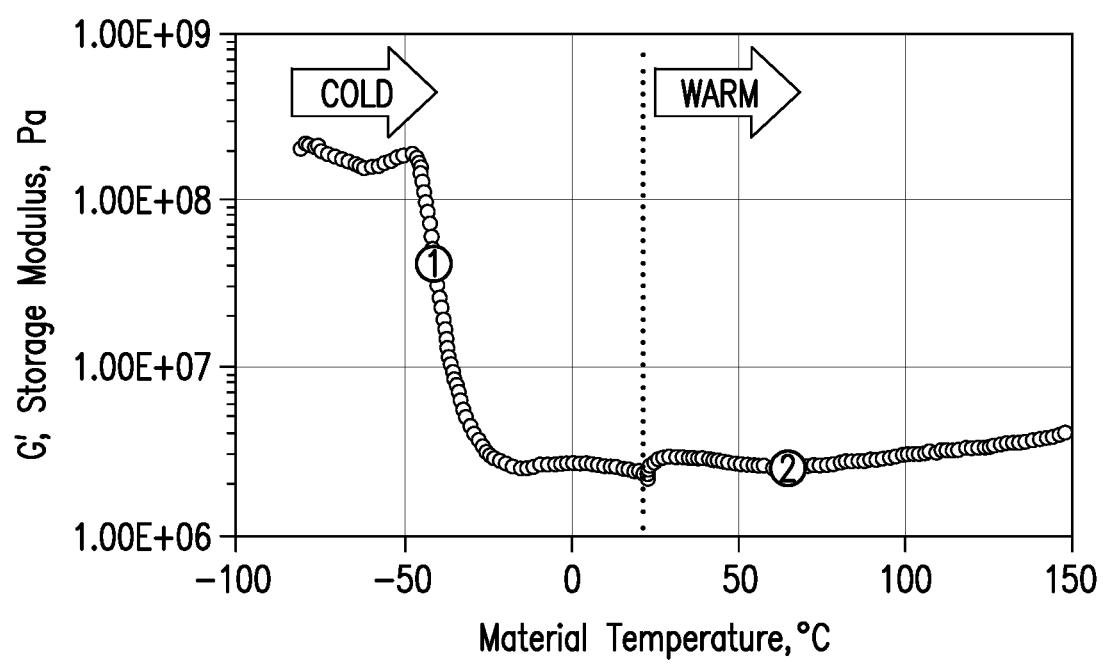
FIG. 12 is a graphical representation of storage modulus (G') in Pa against temperature (° C.) for an exemplary embodiment herein.

Cooling and nozzle extrusion temperatures may be derived and chosen using material properties as described herein as measured using analytical tools, such as a dynamic mechanical analysis (DMA). With reference to FIG. 12, the storage modulus may be measured across a range of temperatures, e.g., from coolant temperatures to curing temperatures of the curable fluoropolymer compositions or curable perfluorpolymer compositions in the filament. In some instances, multiple DMA testing and analyses may be undertaken using varying specimens and the end results normalized by matching the DMA data at overlapping temperatures. FIG. 12 is an exemplary profile showing a range of storage modulus values that is derived from two DMA tests in which the first test spanned from −80° C. to 20° C., and the second test spanned from 20° C. to 140° C. The storage modulus data at 20° C. was used to "match" or scale the two data sets such that the relative storage modulus as a function of temperature is characterized sufficiently for use.

The cooling temperature and nozzle extrusion temperature may be selected to determine the relative storage modulus during the additive manufacturing printing process. For example, point 1 shown on exemplary FIG. 12 corresponds to a −40° C. temperature and a 50 MPa storage modulus for the filament evaluated at a point where the filament is being driven through the drive and support wheels, 244', 246', such as the drive gears shown in FIG. 11, also at a corresponding point 1 in FIG. 11. The temperature at a point 2 on FIG. 11 which is at the hot end of the drive mechanism when entering the nozzle for printing is then selected to be 60° C. at a point 2 where the storage modulus is 2 MPa as indicated by corresponding point 2 in FIG. 12.

Other advantages of the apparatus and process when incorporating a pre-cooler E, can be identified with reference to the "free column length," of the support tube, which is defined generally herein as the distance from a centerline point within the drive rollers or gears to the entrance below the rollers/gears into the lower portion of support tube extending beneath the drive mechanism. In the example apparatus shown in FIG. 11, which is prepared using a commercial Hemera® extruder, commercially available from E3D Online, Oxfordshire, UK that is equipped with dual drive gears, and a controlled minimal clearance, the free column length is 5 mm and the filament diameter is 1.75 mm. The extruder having the drive mechanism as noted was mounted on a mounting bracket for printing use. With respect to the free column length, considering the driven filament as a simply supported column, the critical buckling force ($F_{cr}$) of the filament is estimated as:

$$F_{cr} = \frac{\mu E I \pi^2}{L^2} \tag{I}$$

wherein, $\mu$ is the constraint factor, E is Young's Modulus, I is the moment of inertia of the cross-sectional area and L is the free column length. With the use of a pre-cooler, such as pre-cooler E of FIG. 11, the critical buckling force $F_{cr}$ is increased in this exemplary embodiment from 0.36 N to 9.1 N, corresponding to an increase in critical buckling pressure, $P_{cr}$ (maximum pressure), which is calculated as $$F_{cr}/A \qquad (II)$$

wherein A is the cross-sectional area of the filament, of 0.15 MPa to 3.8 MPa.

An increase in the maximum pressure as noted above greatly increases the achievable draw-down of the filament in the process and apparatus, thereby allowing use of a reduced nozzle orifice diameter. The achievable draw-down (meaning reduction in filament diameter from entry into the nozzle through exit of the nozzle, can be estimated by considering the filament extrusion as a solid material undergoing elastic-plastic deformation. The maximum draw ratio, B, is then estimated as Euler's Number, e, which is approximately 2.71828, raised to the ratio of the maximum pressure to the storage modulus, k, of the material being extruded. That is $$B = e^{P_{cr}/k} \qquad (III)$$

For the material properties and filament described, the use of the pre-cooler for curable fluoro- and perfluoropolymer compositions printed herein in this exemplary embodiment is able to increase the maximum draw ratio from 1.1 without a pre-cooler to 6.6 with the pre-cooler. The minimum orifice diameter may then be estimated as the filament diameter divided by the square root of the draw ratio. The analysis suggests that use of the pre-cooler herein allows the nozzle orifice to decrease from 1.69 mm to 0.68 mm. This principle and design may be employed with the curable fluoropolymer compositions and curable perfluoropolymer compositions and other materials where such benefits would be advantageous in additive manufacturing printing.

Figure 5:
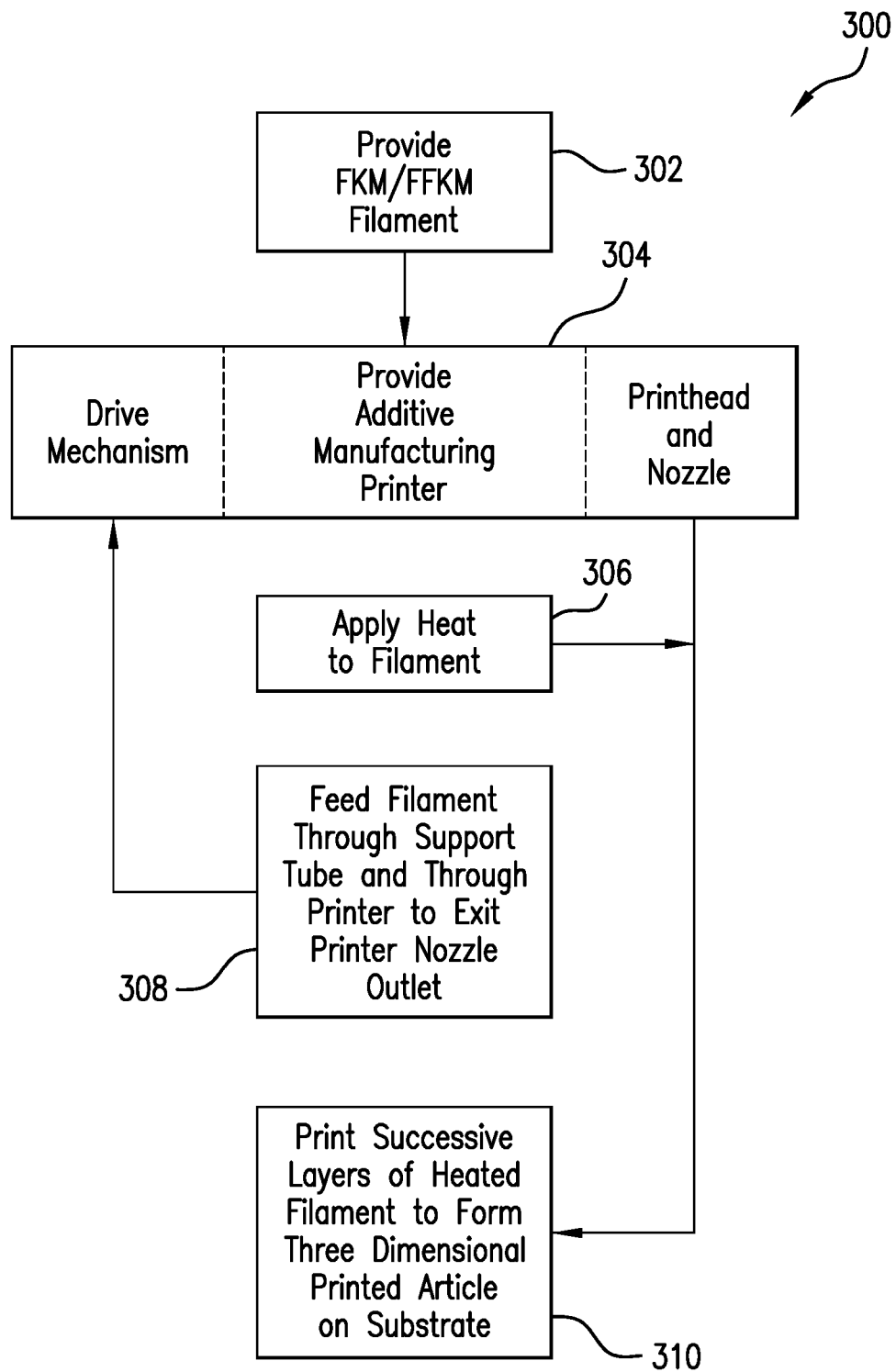
FIG. 5 is a schematic flowchart representation of steps for use in the invention herein.

In the process herein, in one exemplary embodiment 300, as represented in FIG. 5 the method includes the step 302 of providing the curable polymer, such as the fluoropolymer or perfluoropolymer compositions noted above in extruded form (i.e., they may be pre-compounded and extruded into an initial rope or filament). The method also includes the step 304 of providing the additive manufacturing printer according to any embodiments herein, which printer preferably includes a drive mechanism and a printhead and nozzle. Heat is applied in step 306 to the filament which may be done at various phases of the process, including at the feed stage, within the additive manufacturing printer drive mechanism, or in the printhead and/or nozzle. A further step 308 includes feeding the filament through a support tube and through the additive manufacturing printer so that it exits as an extrudate from the outlet of the printhead nozzle and onto a substrate. Successive layers may then be applied in step 310 upon the initially extruded layer on the substrate to form a three-dimensional, printed article on the substrate.

The invention will now be described with respect to the following non-limiting examples.

Example 1

Three curable fluoropolymers were evaluated for additive manufacturing using an apparatus as shown in FIG. 2 herein. The first curable fluoropolymer compound of an FKM commercially available as Tecnoflon® 959 from Solvay (Sample 1). The second compound included an FFKM available from Greene, Tweed of Kulpsville, PA as Chemraz® G20 (Sample 2). The third compound included an FKM based on Tecnoflon® VPL 75545 (Sample 3).

The FFKM in Sample 2 included a curable perfluoropolymer and a bisphenyl-based curative which was added at 1.3 parts by weight to the base perfluoropolymer. No additional additives were incorporated in the composition.

The FKM in Sample 1 was blended with a peroxide cure system making up 5 parts by weight per hundred parts of the FKM polymer, silica filler was incorporated in 13 parts by weight per hundred parts of the FKM polymer, and a colorant and processing aid were further included. The Sample 2 FFKM and the Sample 1 FKM compounded materials were selected based on the rigidity associated with the compounded FFKM and the tackier nature of the FKM compound, as well as the respective glass transition temperatures, filament extrusion capability and moving die rheology (MDR) properties of the materials. The third Sample FKM included a carbon black filler as well as 2 parts by weight per hundred parts of the polymer of a peroxide curative and 3 parts per hundred parts by weight of the polymer of co-curative. This compound was also chosen for tackiness and a varied curing and thermal analysis curve in comparison to the other samples.

Filaments were extruded in two outer diameter sizes, 1.7 mm and 2.7 mm. Experimental trials were conducted both with and without the curative to assess the performance and properties of the materials as filaments. The DSC profiles were run, and are shown, respectively for Samples 1, 2, and 3 in FIGS. 8, 9 and 10 to provide the best ranges and guidelines for printing the materials of the Samples.

The materials were introduced for printing into both an Ultimaker and a Monoprice Maker Select Plus. The latter was most suitable for printing the materials and used for further trials.

The apparatus included an upwardly and downwardly extending support tube formed of PTFE for supporting the extruded filament. A side hole was provided to the tube as described above. The step motor was modified by a geared transmission including a series of planetary gears as shown in FIG. 7A, and the nozzle opening was 2 mm. The temperature in the apparatus was kept at 115° C. for printing, and the acceptable range for printing the FKM and FFKM (which is about 90° C. to about 120° C.).

The print head was set for a layer height of 1 mm, a line width of 1.75 mm, an infill density of 100%, a printing temperature of 200° C., a build plate temperature of 25° C. and a print speed of 4 mm/s. This layer height and line width were increased from standard print levels to coincide with the increased nozzle width.

The temperature was maximized to lower the viscosity sufficiently for an easier extrusion from the nozzle and to encourage adhesion to a frictional surface formed of an adhesive tape material positioned on the substrate surface. Tensile bars according to ASTM D412-C were successfully printed from the materials.

Example 2

Figure 11A:
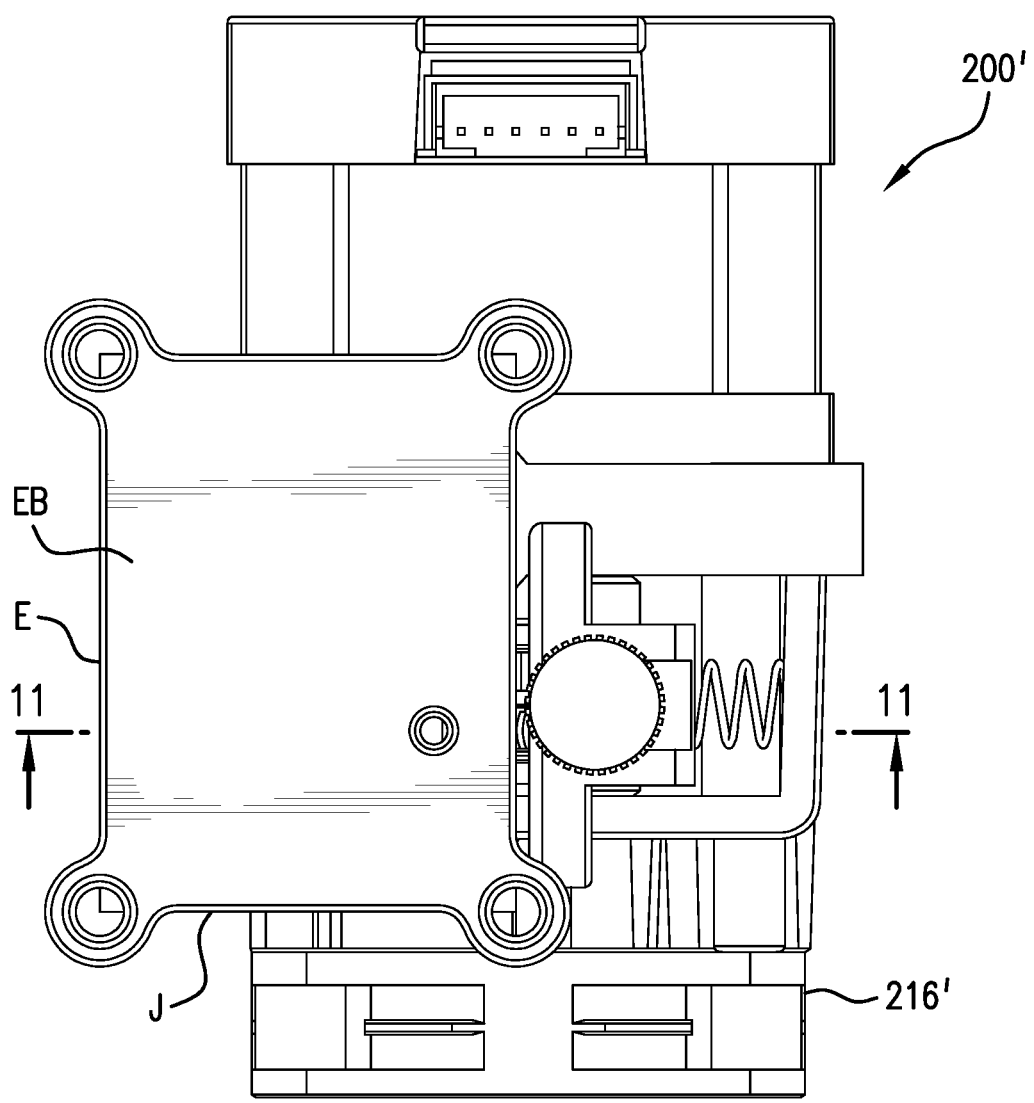
FIG. 11A is a top elevational view of the cooling apparatus of FIG. 11.

A compound was prepared based on the perfluoropolymer sold as Tecnoflon LT, which was a semi-tacky elastomer material. The compound (Sample 4), included a curable perfluoropolymer and a bisphenyl-based curative which was added at 1.3 parts by weight to the base perfluoropolymer. No additional additives were incorporated in the composition was printed using a printing apparatus as shown in FIGS. 11 and 11A having a pre-cooler mounted on a moveable Hemera® extruder as a drive mechanism therein. Samples were run using a nozzle opening at 1.5 mm and a nozzle temperature of 80° C.

Prior to printing, DMA analysis data was collected on both Sample 4 and Sample 3 (used in Example 1). Regarding Sample 4, DMA analysis was run at low temperatures from −80° C. to 20° C. at a heating rate of 3° C./min and at a 50 gm force/load. Cooling was achieved using liquid nitrogen. A compound sample was prepared as an O-ring with a 139 in./diameter ratio using an uncured material. The DMA analysis was a tension DMA. The high temperature DMA analysis was collected for the samples at temperatures from 25° C. to 150° C. at the same heating rate with both a 500 gm force/load and a 50 gm force/load, and the same compound sample dimension, but with a compression DMA analysis. The same tests were run with Sample 3 but only at 50 gm force/load. This data was used to select a printing temperature and to estimate storage modulus, G', in Pa. The estimate graph shown for Sample 4 appears in FIG. 12.

The estimated storage moduli were used as elastic moduli for estimating the maximum buckling force, maximum printing pressure and maximum draw-down ratio. The estimated moduli and calculated buckling force $F_{cr}$, as well as the calculated maximum pressure (MPa), Maximum draw ratio are shown below in Table 2. Based on this data, a minimum nozzle diameter (mm) was determined for the apparatus employed.

TABLE 2

|  | Cold Semi-Tacky Sample 4 | Warm Semi-Tacky Sample 4 | Cold Sticky Sample 3 | Warm Sticky Sample 3 |
|---|---|---|---|---|
| Estimated Storage Modulus (MPa) | 1370 | 80 | 50 | 2 |
| Buckling Force (N) | 389 | 22.8 | 9.1 | 0.36 |
| Maximum Pressure (MPa) | 162 | 9.4 | 2.8 | 0.15 |
| Max Draw Ratio ($B = A_0 A_f$) | 0.64 | 1.65 | 0.68 | 1.69 |

From this data, samples were printed into test plates on metal in the form of seals using filaments of a 1.75 mm diameter and a free column length of 0.005 m using the apparatus of FIGS. 11 and 11A.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An additive manufacturing method for forming a fluorine-containing thermoset elastomer article, comprising
providing a filament formed of a curable fluoropolymer composition comprising at least one curable fluoropolymer and at least one curative;
providing an additive manufacturing printer having a drive mechanism and a printer nozzle;
analyzing a curable fluoropolymer compound to estimate a storage modulus to determine printing parameters for a filament formed of the curable fluoropolymer;
feeding the filament into the additive manufacturing printer through the drive mechanism and through a longitudinal passage defined by an interior wall of a support tube, wherein the support tube extends from a first end to a second end, and wherein the second end of the support tube is positioned to allow for fluid communication with and/or passage of the filament into an inlet to the printer nozzle;
applying heat to the filament, wherein the filament is heated in the printer nozzle to a temperature that is not greater than about 200° C. which is sufficient to initiate flow of the curable fluoropolymer composition within the printer apparatus and wherein about 25% or less curing occurs; and
printing successive layers of the heated filament comprising fluorine-containing thermoset elastomer which is exiting an outlet of the nozzle onto a substrate using the additive manufacturing printer to form the fluorine-containing thermoset elastomer article.

2. The method according to claim 1, wherein filament is formed by extruding the curable fluoropolymer composition.

3. The method according to claim 1, further comprising cooling the filament prior to introducing the filament to the support tube.

4. The method according to claim 1, further comprising cooling the filament prior to introducing the filament into the printer drive mechanism.

5. The method according to claim 1, wherein the filament is heated to a temperature that is below a temperature corresponding to a time, T2, associated with the curable fluoropolymer composition as determined using a test method of ASTM D2084 on a rubber process analyzer.

6. The method according to claim 1, wherein the curable fluoropolymer is partially fluorinated.

7. The method according to claim 1, wherein the curable fluoropolymer is a curable perfluoropolymer.

8. The method according to claim 7, wherein the start of curing of the perfluoropolymer is shown by thermal analysis using a differential scanning calorimeter.

9. The method according to claim 1, wherein the filament is heated to a temperature that is about 105° C.

10. The method according to claim 9, wherein the filament is heated to a temperature that is about 115° C. to about 160° C.

11. The method according to claim 1, wherein the heat is generated by a heating mechanism in the additive manufacturing printer.

12. The method according to claim 1, wherein the drive mechanism comprises a drive wheel and a support wheel, and the method further comprises passing the filament through the drive wheel and the support wheel prior to entering the first end of the support tube.

13. The method according to claim 1, wherein the drive mechanism comprises a drive wheel and a support wheel, and the first end of the support tube extends upwardly through the drive mechanism between the support wheel and the drive wheel to support the filament as it leaves a feed roller.

14. The method according to claim 13, wherein support tube wall defines a side opening extending transversely through the support tube wall and the wall around the opening is contoured to the shape of the drive wheel, and wherein the method further comprises feeding the filament so that it contacts the drive wheel in the area of the side opening as the filament passes through the drive mechanism.

15. The method according to claim 1, wherein the printer drive mechanism comprises geared drive rollers and the method further comprises feeding the filament through the geared drive rollers.

16. The method according to claim 15, wherein the support tube extends below the geared drive rollers.

17. The method according to claim 16, wherein a portion of the support tube extends above the geared drive rollers and the method further comprises feeding the filament through the portion of the support tube above the geared rollers and into the geared rollers.

18. The method according to claim 17, further comprising cooling the portion of the support tube above the geared rollers.

19. The method according to claim 1, wherein the outlet of the nozzle defines an opening which is wider, as measured transversely across the opening, than an outer dimeter of the filament as measured transversely before heating.

20. The method according to claim 1, wherein the opening of the nozzle outlet has a width measured transversely across the outlet opening in a widest dimension that is about 10% to about 200% of the outer diameter of the filament as measured transversely before heating.

21. The method according to claim 1, wherein a portion of the nozzle extending from a printhead of the printer, has a length measured from an inlet to the portion of the nozzle to the nozzle outlet, as measured longitudinally along the nozzle portion, that is about 5 to about 20 times larger than a diameter of the nozzle outlet.

22. The method according to claim 1, wherein the nozzle has a length in a heated portion thereof, as measured longitudinally along the heated portion of the nozzle that is about 1 to about 10 times a diameter of the nozzle outlet.

23. The method according to claim 22, wherein the length of the heated portion of the nozzle is about 15 mm to about 30 mm when a filament diameter is about 1.7 mm.

24. The method according to claim 1, wherein the filament formed of a curable fluoropolymer composition prior to heating has an outer diameter of about 0.2 mm to about 20 mm.

25. The method according to claim 24, wherein the filament formed of a curable fluoropolymer composition prior to heating has an outer diameter of about 1.0 mm to about 3.0 mm.

26. The method according to claim 1, wherein the additive manufacturing printer includes a drive motor for operating the drive mechanism that provides sufficient torque to overcome friction between the filament and the additive manufacturing drive printer while providing sufficient pressure to extrude the material through the additive manufacturing printer and out the nozzle.

27. The method according to claim 26, wherein the drive motor is a stepper motor having a geared transmission to increase the torque of the stepper motor.

28. The method according to claim 1, wherein the storage modulus is estimated using DMA or parallel plate rheometry to optimize the printing parameters for a filament of the curable fluoropolymer.

* * * * *